United States Patent
Shimmitsu et al.

(10) Patent No.: US 9,276,824 B2
(45) Date of Patent: Mar. 1, 2016

(54) ACCESS CONTROL METHOD, SERVER DEVICE, AND STORAGE DEVICE

(71) Applicant: FUJITSU LIMITED, Kawasaki-shi (JP)

(72) Inventors: Masaru Shimmitsu, Kawasaki (JP); Naoaki Okayasu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 13/790,946

(22) Filed: Mar. 8, 2013

(65) Prior Publication Data
US 2013/0262649 A1 Oct. 3, 2013

(30) Foreign Application Priority Data

Mar. 29, 2012 (JP) ................. 2012-075578

(51) Int. Cl.
G06F 15/16 (2006.01)
H04L 12/24 (2006.01)
G06F 3/06 (2006.01)
G06F 9/455 (2006.01)

(52) U.S. Cl.
CPC ............ H04L 41/5022 (2013.01); G06F 3/061 (2013.01); G06F 3/0656 (2013.01); G06F 3/0659 (2013.01); G06F 3/0673 (2013.01); G06F 2009/45579 (2013.01)

(58) Field of Classification Search
CPC .................. H04L 41/0213; H04L 29/08072; H04L 29/06; H04L 41/22; H04L 41/12
USPC ........................................................ 709/223
See application file for complete search history.

(56) References Cited

U.S. PATENT DOCUMENTS

| 5,982,891 | A | 11/1999 | Ginter et al. |
| 5,996,026 | A | 11/1999 | Onodera et al. |
| 8,122,116 | B2 | 2/2012 | Matsunaga et al. |
| 8,291,416 | B2 | 10/2012 | Cartales |
| 8,495,254 | B2 | 7/2013 | Hashimoto |
| 2002/0087694 | A1* | 7/2002 | Daoud et al. ................... 709/226 |
| 2006/0064697 | A1* | 3/2006 | Kagi et al. ..................... 718/103 |

(Continued)

FOREIGN PATENT DOCUMENTS

| JP | 2010-108114 | 5/2010 |
| JP | 2010-108409 | 5/2010 |

(Continued)

OTHER PUBLICATIONS

Korean Office Action dated Feb. 21, 2014 issued in corresponding Korean Patent Application No. 10-2013-31744, with English Translation, 6 pages.

(Continued)

*Primary Examiner* — Philip Chea
*Assistant Examiner* — Wuji Chen
(74) *Attorney, Agent, or Firm* — Fujitsu Patent Center

(57) ABSTRACT

A method of controlling access from a virtual machine executed in a server device to a storage device, the method including acquiring a service level corresponding to a virtual machine identifier that identifies a virtual machine and is output from the virtual machine together with an input/output command by using the virtual machine identifier and by referring to a storage device that stores correspondence relationship between the virtual machine identifier and the service level and executing the input/output command from the virtual machine in accordance with the acquired service level in at least either the server device or the storage device.

5 Claims, 17 Drawing Sheets

(56) References Cited

U.S. PATENT DOCUMENTS

| | | | |
|---|---|---|---|
| 2006/0184936 A1* | 8/2006 | Abels et al. ................ | 718/1 |
| 2007/0174429 A1 | 7/2007 | Mazzaferri et al. | |
| 2009/0260008 A1* | 10/2009 | Cho et al. .................. | 718/1 |
| 2010/0023554 A1 | 1/2010 | Fujimoto et al. | |
| 2010/0107161 A1 | 4/2010 | Nishikawa | |
| 2011/0078679 A1* | 3/2011 | Bozek et al. ............... | 718/1 |
| 2011/0154318 A1 | 6/2011 | Oshins et al. | |
| 2011/0239216 A1 | 9/2011 | Miyajima | |
| 2011/0246990 A1* | 10/2011 | Shimogawa ................ | 718/1 |
| 2011/0271280 A1* | 11/2011 | Cao et al. ................... | 718/1 |

FOREIGN PATENT DOCUMENTS

| | | |
|---|---|---|
| JP | 2010-211458 A | 9/2010 |
| JP | 2013-205870 A | 10/2013 |
| WO | WO-2005/029363 A1 | 3/2005 |
| WO | 2010/117691 A2 | 10/2010 |
| WO | 2011/115844 A2 | 9/2011 |

OTHER PUBLICATIONS

Blast Software: "BLAST—Professional UNIX User Manuel," Blast Software, Inc., 2000, "Secure BLAST," Chapter 11, [retrieved from the internet on Aug. 20, 2013], URL:http://www.blast.com/software/Unix_Manual.pdf, pp. 149-169, XP-002711607.

California State University: "UNIX User's 1, 6, 8 Guide," California State University, Aug. 1999, [retrieved from the internet on Aug. 20, 2013] URL:http://www.csus.edu/indiv/g/ghermanb/Research_Foo/unixgde.pdf, pp. 1-19, XP-002711608.

Extended European Search Report dated Sep. 11, 2013 for corresponding European Application No. 13158537.4.

Japanese Office Action mailed on Oct. 27, 2015 for corresponding Japanese Patent Application No. 2012-075578, with Partial English Translation, 6 pages.

* cited by examiner

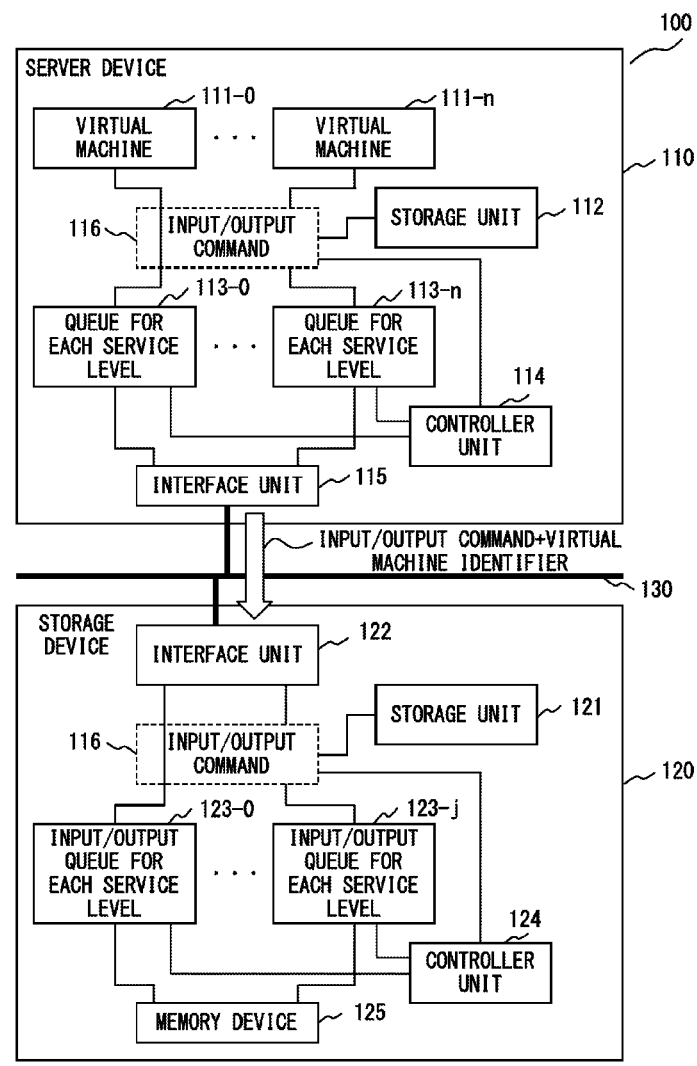
F I G. 1

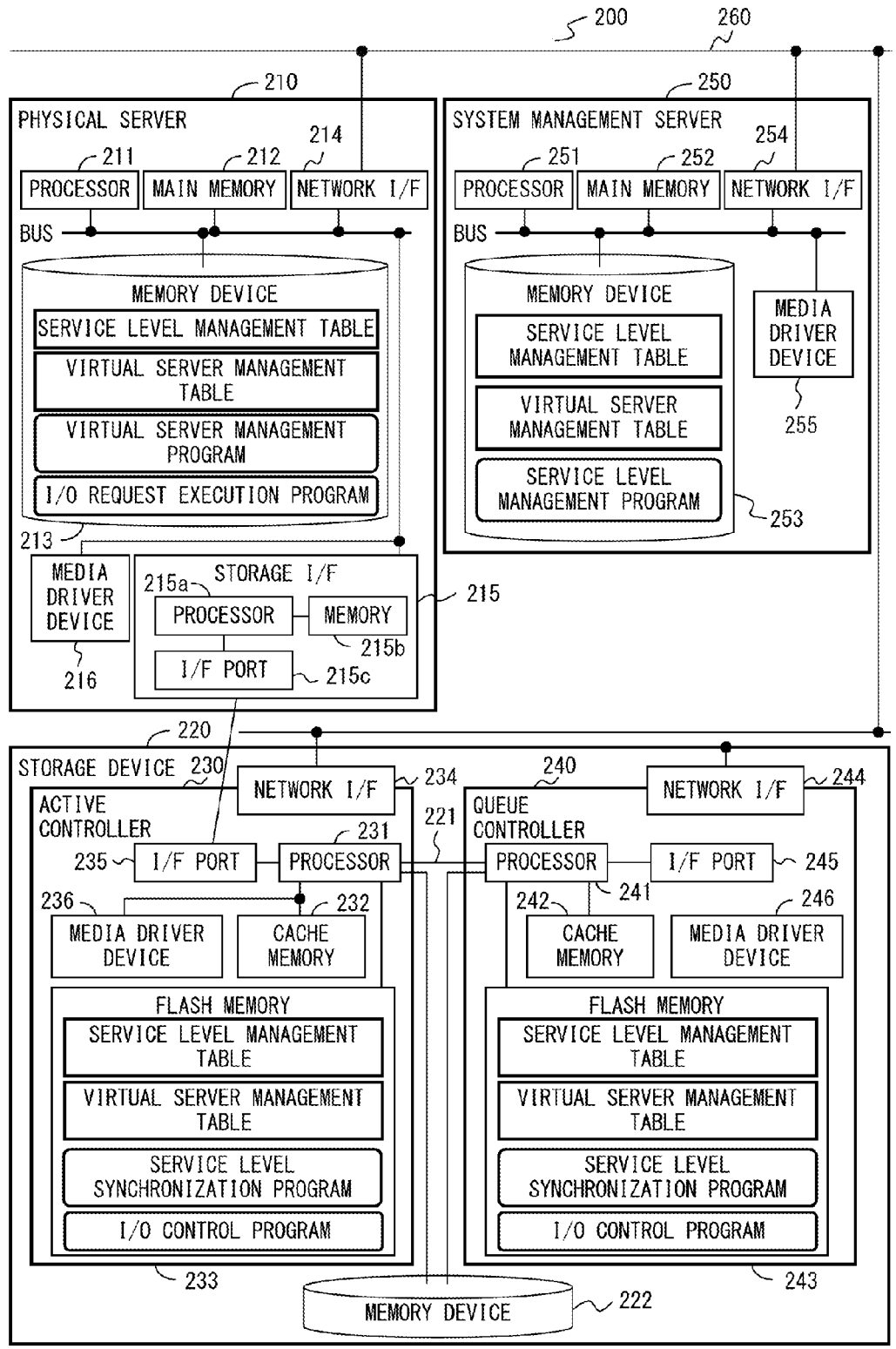
F I G. 2

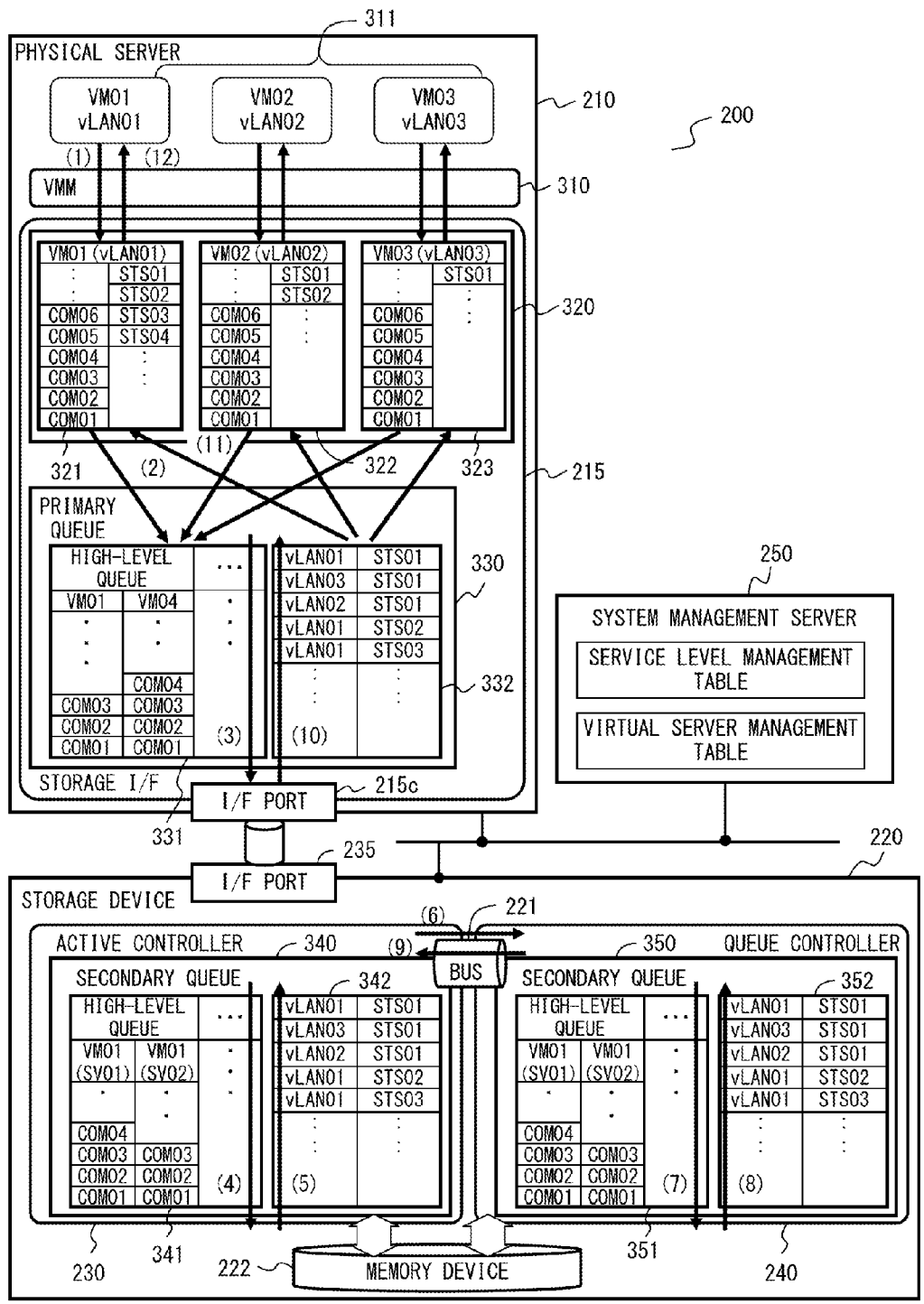
F I G. 3

| PHYSICAL SERVER | VIRTUAL SERVER (UNIQUE ID) | IDENTIFIER | SERVICE LEVEL | AVERAGE I/O PROCESSING TIME PERIOD (PHYSICAL SERVER) | AMOUNT OF TRANSFER DATA | | I/O CONTROL NUMBER | AVERAGE I/O PROCESSING TIME PERIOD (STORAGE DEVICE) |
|---|---|---|---|---|---|---|---|---|
| | | | | | WRITE PROCESSING | READ PROCESSING | | |
| SV01 | VM01 | vLAN01 | HIGH | 12ms | 90MB/s | 200MB/s | 0 | 10ms |
| SV01 | VM02 | vLAN02 | MIDDLE | 32ms | 60MB/s | 120MB/s | 300 | 20ms |
| SV01 | VM03 | vLAN03 | LOW | 35ms | 30MB/s | 50MB/s | 0 | 28ms |
| SV01 | VM04 | vLAN04 | HIGH | 20ms | 90MB/s | 200MB/s | 0 | 10ms |
| ⋮ | ⋮ | ⋮ | ⋮ | ⋮ | ⋮ | ⋮ | ⋮ | ⋮ |

F I G. 5

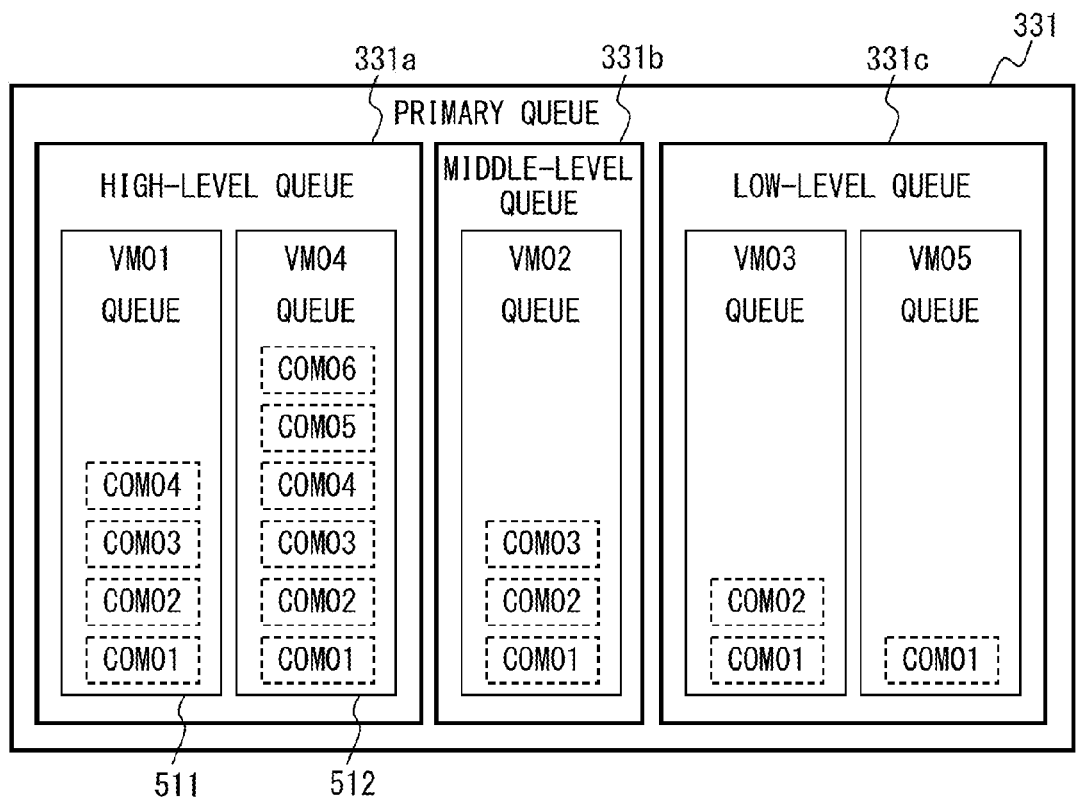
F I G. 6

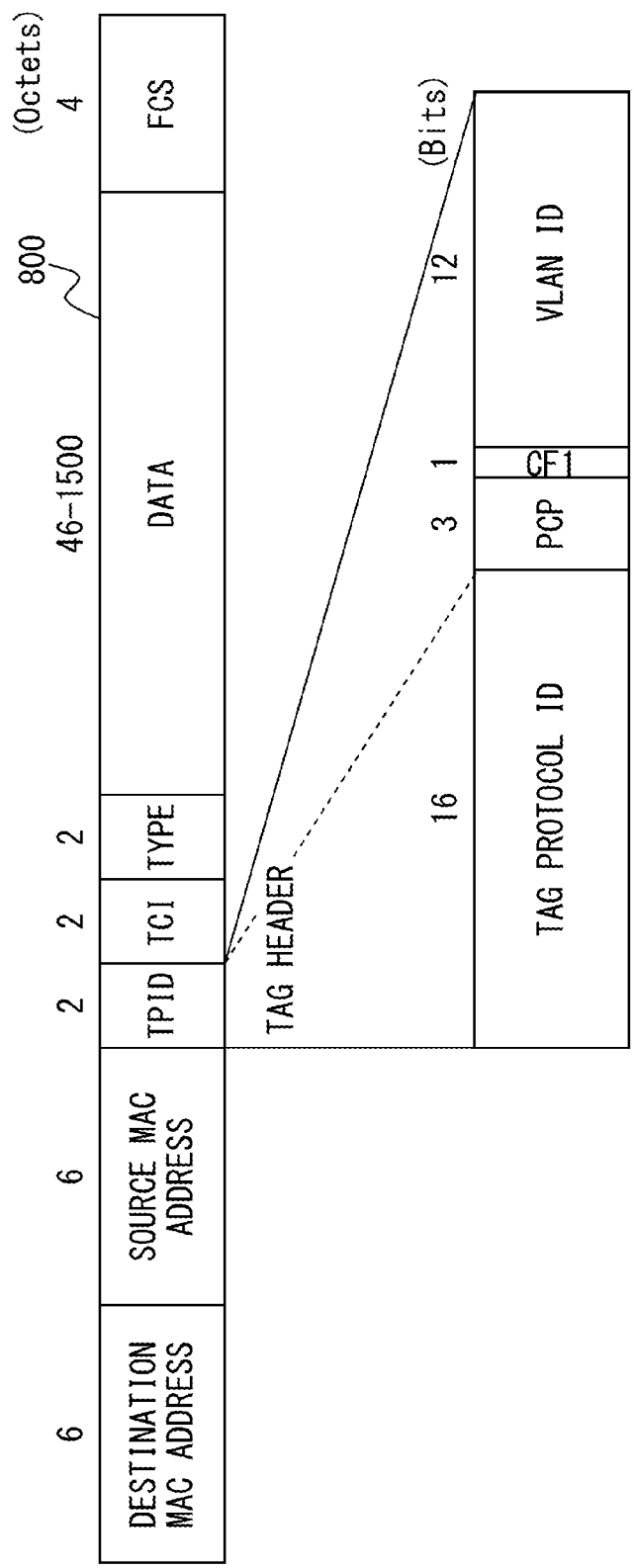
F I G. 8

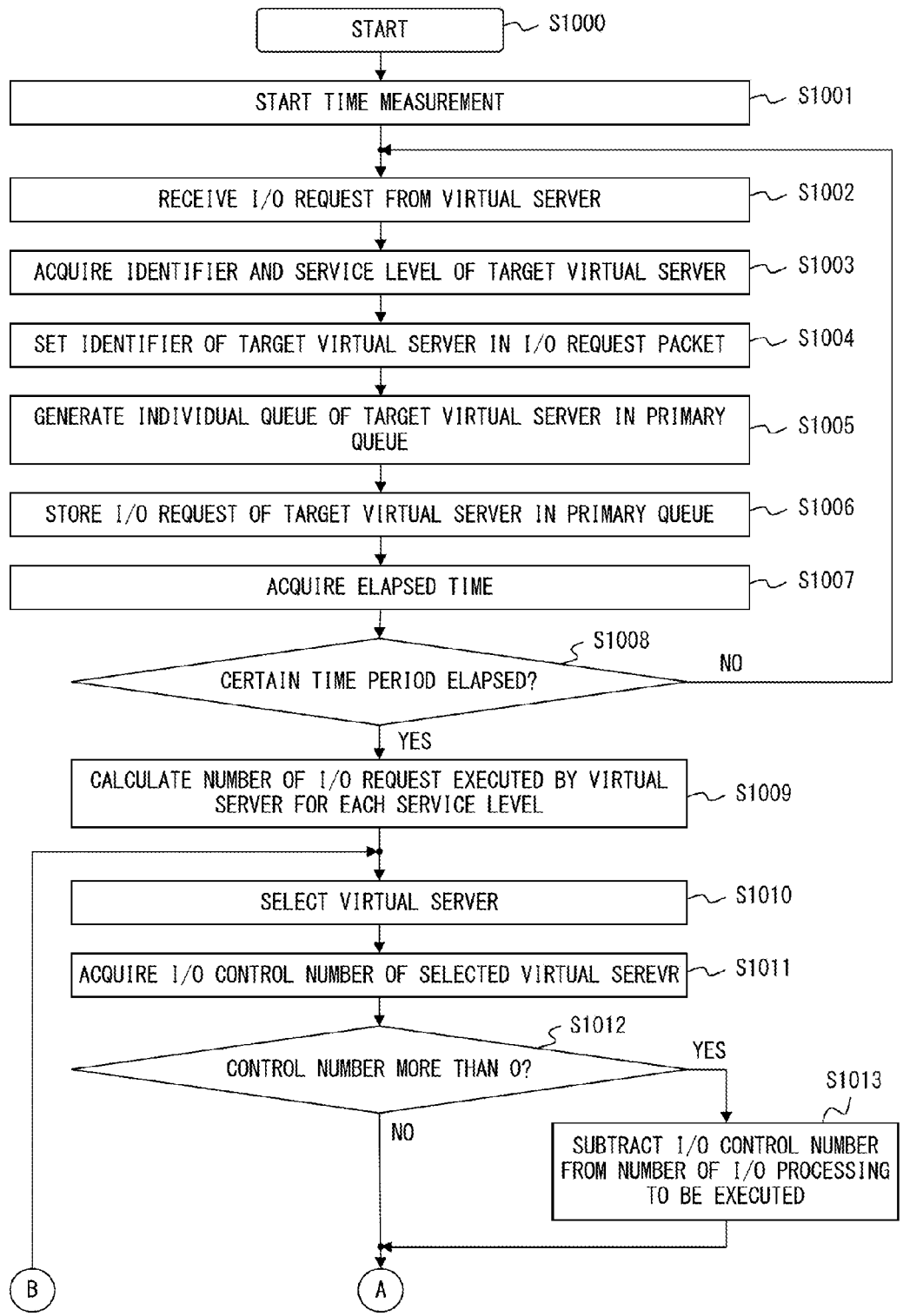
F I G. 1 0 A

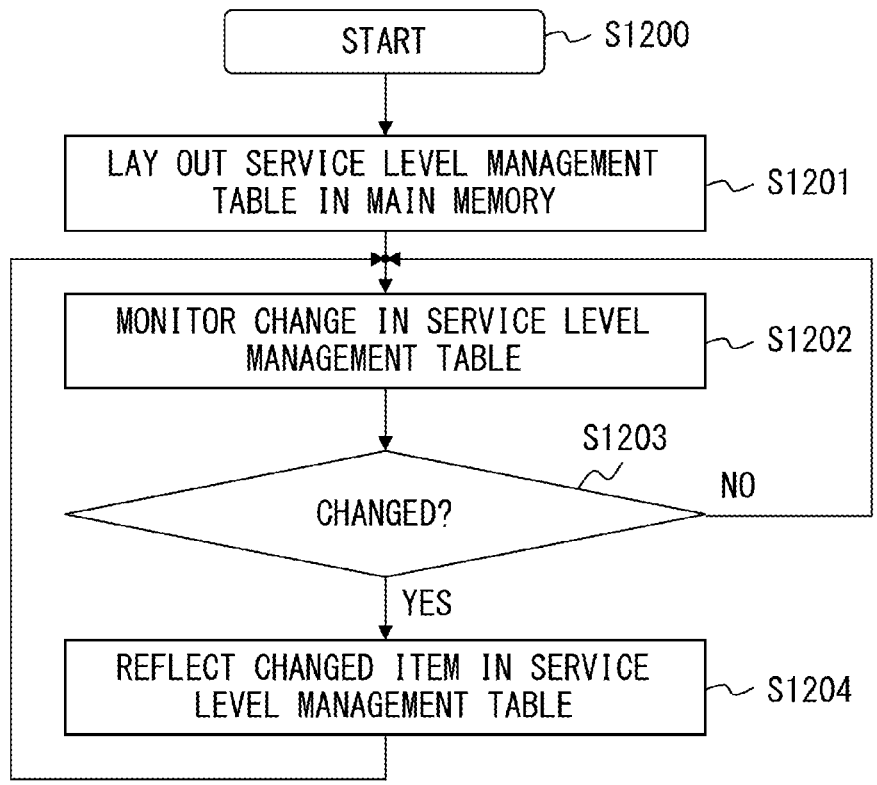
F I G. 1 1

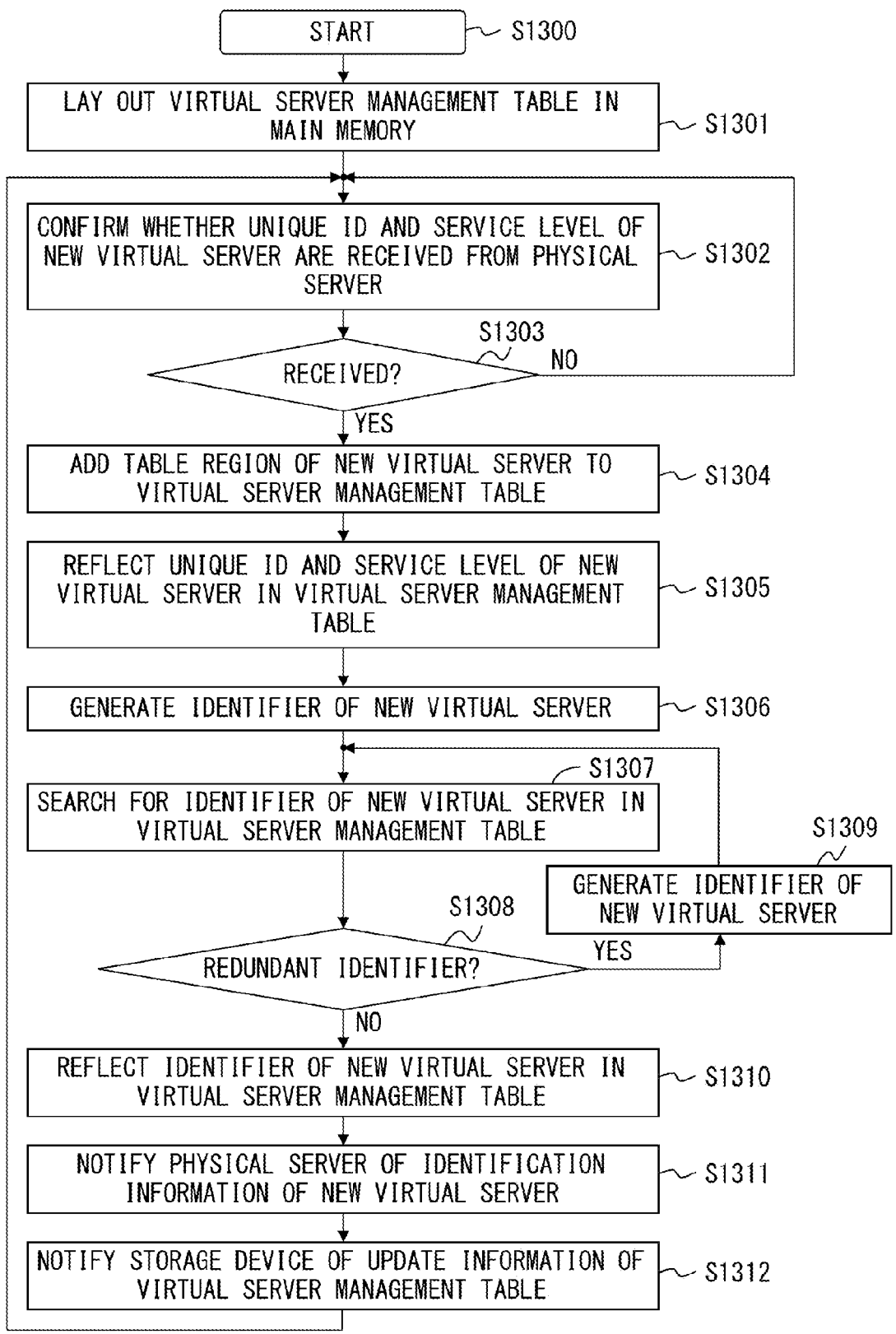
F I G. 1 2

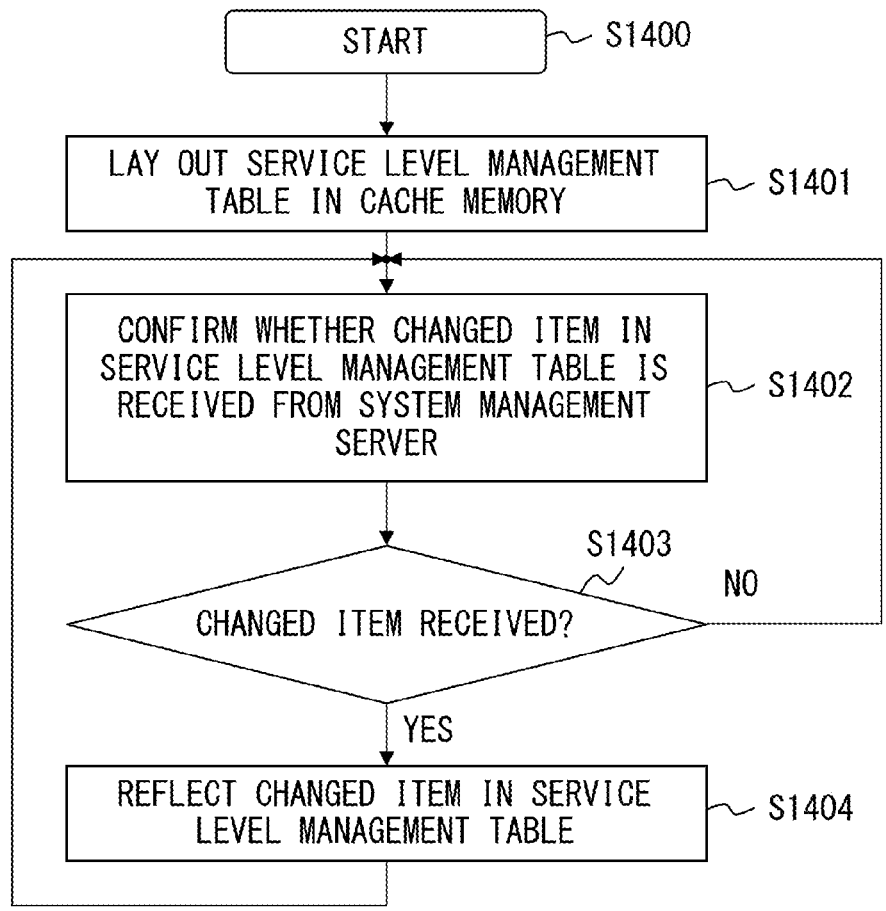
F I G. 1 3

ACCESS CONTROL METHOD, SERVER DEVICE, AND STORAGE DEVICE

CROSS-REFERENCE TO RELATED APPLICATION

This application is based upon and claims the benefit of priority of the prior Japanese Patent Application No. 2012-075578, filed on Mar. 29, 2012, the entire contents of which are incorporated herein by reference.

FIELD

The embodiments discussed herein are related to a control method of access from a virtual machine on a server device to a storage device, and the server device and the storage device.

BACKGROUND

There are conventionally computer systems that include multiple servers providing virtual servers and a storage device. When data access from the multiple servers to the storage device is executed, the throughput of the computer system is distributed in accordance with the total number of the executed data accesses. For that reason, as the number of the executed data accesses increase, the execution time for each data access becomes longer. As a result, the throughput of the computer system is reduced.

In relation to the above technology, a computer system has been known that controls its performance as the entire computer system in consideration of both the servers providing virtual servers and the storage system. This computer system associates the settings of servers that adjust I/O processing performance between virtual servers by controlling I/O processing for each of the virtual servers in accordance with I/O priority relating to the virtual server with the setting of the storage device.

In addition, a management server has been known that moves virtual machines in accordance with input/output (I/O) to or from an array group in the virtual machine after moving. This management server calculates a predicted amount of I/O in the virtual machine after the moving and when the maximum amount of I/O in the array group connected to the moved virtual machine exceeds the predicted amount of I/O, the management server searches for an array group in which the maximum amount of I/O is less than the predicted amount of I/O.

[Patent Document 1] Japanese Laid-Open Patent Publication No. 2010-108409

[Patent Document 2] Japanese Laid-Open Patent Publication No. 2010-108114

SUMMARY

According to one aspect of the embodiments, an access control method is a control method of access from the virtual machine executed in a server device to a storage device, and performs the following processing.

On the basis of a virtual machine identifier for identifying the virtual server, which is output from the virtual machine together with an input/output command, a service level corresponding to the virtual machine identifier is acquired by referring to a storage device that stores a correspondence relationship between the virtual machine identifier and the service level.

In at least either the server device or the storage device, the input/output command from the virtual machine is executed in accordance with the acquired service level.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram describing an overview of a storage system 100;

FIG. 2 is a diagram illustrating an example of a configuration of a storage system 200;

FIG. 3 is a diagram describing an overview of the storage system 200;

FIG. 5 is a diagram illustrating an example of a virtual server management table 500;

FIG. 6 is a diagram illustrating an example of a primary queue 331 provided in a physical server 210;

FIG. 8 is a diagram illustrating an example of an I/O request packet 800 transmitted by a virtual server;

FIG. 10A is a flowchart illustrating execution processing of an I/O request performed by the physical server 210;

FIG. 11 is a flowchart illustrating monitoring processing of the service level management table 400 performed by a system management server 250, FIG. 12 is a flowchart illustrating monitoring processing of the virtual server management table 500 performed by the system management server 250;

FIG. 13 is a flowchart illustrating monitoring processing of the service level management table 400 performed by the storage device 220;

DESCRIPTION OF EMBODIMENTS

Figure 4:
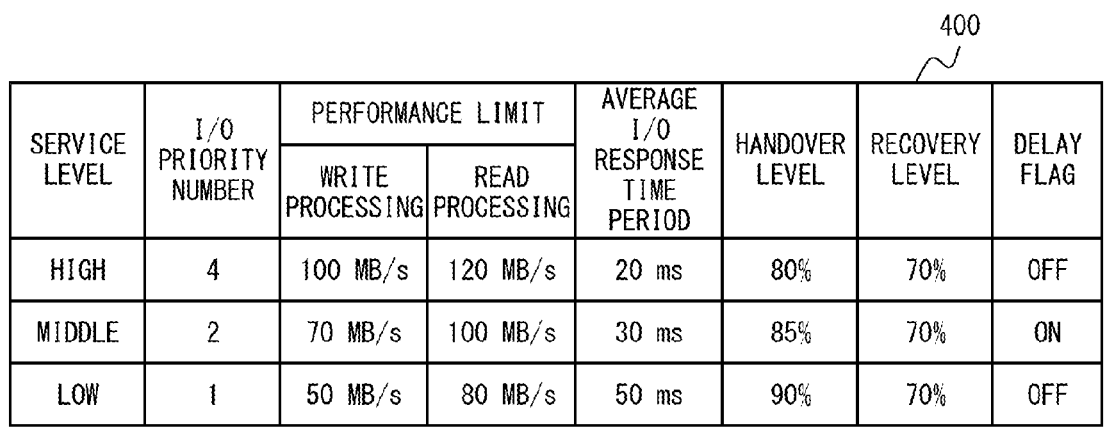
FIG. 4 is a diagram illustrating an example of a service level management table 400.

According to the inventor's observation, in order to prevent the throughput of the computer system from being reduced it may be possible, for example, for a storage device to perform priority control of data access to the storage device in accordance with access levels defined for each of the services connected to the storage device.

However, when a service level needs to be set in each virtual server provided by a server for example, it is difficult to perform in the storage device priority control of data access to the storage device in accordance with access levels.

In the following description, one of the embodiments of the present invention is described on the basis of FIG. 1 to FIG. 14C. Note that the embodiment described hereafter is only an example, and is not intended to exclude various modifications or technical applications that are not indicated in the following descriptions. In other words, the present embodiments may be implemented in various modifications such as a combination of the embodiments without departing from the gist of the present embodiments. The procedures of processing described in the flowcharts in FIG. 9 to FIG. 14C are not intended to limit the order of the processing. It is therefore obvious that the order of processing may be changed, if possible.

<<Embodiment>>

FIG. 1 is a diagram to describe an overview of a storage system 100 according to one of the embodiments.

The storage system 100 includes a server device 110 and a storage device 120. The server device 100 and the storage device 120 are connected to one another so as to be able to communicate with one another through a network 130.

The server device 110 provides either one or two or more virtual machines 111-0, 111-1, ... and 111-n by executing a prescribed program in a CPU (Central Processing Unit), which is not illustrated, provided in the server device 110. Here, n is 1 or larger and is an integer. Any virtual machine of the virtual machines 111-0, 111-1, ... 111-n is hereinafter referred to as "virtual machine 111".

The server device 110 may include a storage unit 112, queues for each service level 113-0, 113-1, ... and 113-m, a controller unit 114, and an interface unit 115. Here, m is 1 or larger and is an integer. Any queue for each service level of the queues for each service level 113-0, 113-1, ... and 113-m is hereinafter referred to as a "queue for each service level 113".

The storage unit 112 stores a service level set to the virtual machine 111 in association with a virtual machine identifier that identifies the virtual machine 111. A memory such as RAM (Random Access Memory) may be used for the storage unit 112.

The queue for each service level 113, upon operation of the controller unit 114, stores an input/output command 116 from the virtual machine 111 for each service level corresponding to the virtual machine 111 and is placed into a waiting state.

The controller unit 114 reads the input/output command 116, which is stored in the queue for each service level 113 in accordance with service levels, in an order of the queue.

The interface unit 115 issues the input/output command 116, which is read out by the controller 114, to a storage device 120 together with a virtual machine identifier corresponding to the virtual machine.

The storage device 120 may include a storage unit 121, an interface unit 122, queues for service levels 123-0, 123-1, ... and 123-j, and a controller unit 124. Here, j is 1 or larger and is an integer. Any queue for each service level of the queues for each service level 123-0, 123-1, ... and 123-j is hereinafter referred to as a "queue for each service level 123".

The storage device 120 may further include a memory device 125. The memory device 125 is a memory device to store arbitrary data. One or two or more magnetic disk devices, for example, may be used for the memory device 125.

The storage unit 121 stores a service level set to the virtual machine 111 in association with a virtual machine identifier that identifies the virtual machine 111 to be executed in the server device 110. A memory such as a RAM may be used for the storage unit 121.

The interface unit 122 receives the input/output command 116 together with the virtual machine identifier.

The queue for each service level 123, upon operation of the controller unit 124, stores the received input/output command 116 for each service level corresponding to the virtual machine identifier and is placed into a waiting state.

The controller unit 124 reads the input/output command 116, which is stored in the queue for each service level 123 in accordance with service levels, in an order of the queue, and executes access to the memory device 125.

It should be noted that the example of FIG. 1 illustrates one service device 110 and one storage device 120 for the sake of simplicity. However, this is not intended to limit the storage system 100 to have the configuration illustrated in FIG. 1. The server device 110 may be connected to multiple storage devices 120, or the storage device 120 may be connected to multiple server devices 110.

In the above configuration, at least one of the server device 110 and the storage device 120, for example, obtains a service level corresponding to a virtual machine identifier by using the virtual machine identifier that identifies a virtual machine 111 and is output from the virtual machine 111 together with the input/output command 116, and by referring to the storage unit 112 or 121 that stores a correspondence relationship between the virtual machine identifier and the service level.

At least one of the service device 110 and the storage device 120 executes the input/output command 116 from the virtual machine 111 in accordance with the service level corresponding to the virtual machine identifier.

As described above, according to the storage access control method realized by the storage system 100, it is possible to realize a storage access control method that controls data access from the virtual machine 111 to the storage device 120 for each virtual machine 111.

<<Other Embodiments>>

FIG. 2 is a diagram illustrating an example of a configuration of a storage system 200 according to another embodiment.

The storage system 200 includes a physical server 210, a storage device 220, and a system management server 250. The physical server 210, the storage device 220, and the system management server 250 are connected to one another via a network so as to be able to communicate with one another. The physical server 210 may be connected to the storage device 220 by using a special I/F so as to be able to communicate with each other.

Although FIG. 2 illustrates a case in which only one physical server 210 is connected to the storage device 220, the storage device 220 may be connected with multiple physical servers 210. Similarly, the physical servers may be connected with multiple storage devices 220.

The physical server 210 is an information processor device including a processor 211, a main memory 212, a memory device 213, a network I/F 214, and a storage I/F 215, and a media driver device 216. These devices are connected to a bus and are able to exchange data with each other.

The processor 211 is an arithmetic unit that executes programs to realize storage control according to the present embodiment such as a virtual server management program stored in the memory device 213, in addition to running peripheral devices or various types of software.

The main memory 212 is a volatile memory device used to execute programs. A RAM may be used, for example, for the main memory 212.

The memory device 213 is a non-volatile memory device to store programs that realize the storage control according to the present embodiment in addition to the programs and data necessary to operate the physical server 210. A magnetic disk storage device may be used, for example, for the memory device 213.

The memory device 213 may store, for example, a service level management table, a virtual server management table, a virtual server management program, and an I/O request execution program. The physical server 210 obtains the service level management table and the virtual server management table from a system management server 250 at the time of startup and may store these tables in the memory device 213.

The service level management table is described later in FIG. 3. The virtual server management table is described later in FIG. 4. The virtual server management program is a program to realize processing described later in FIG. 9. The I/O request execution program is a program to realize processing described later in FIG. 10A to FIG. 10B.

The network I/F 214 is a device to connect to a network 260.

The storage I/F 215 is an I/F for performing communication with the storage device 220 in accordance with a particular standard. As the storage I/F 215, an HBA (Host Bus Adapter) of Fiber Channel or an NIC (Network Interface Card) of iSCSI (Internet Small Computer System Interface) may be used.

The storage I/F 215 includes, for example, a processor 215a, a memory 215b, and an I/F port 215c. The processor 215a is an arithmetic unit to execute programs necessary to realize communication with the storage device 220 connected via the I/F port 215c in accordance with a particular standard. The processor 215a executes programs that realize the storage control according to the present embodiment such as an I/O request execution program stored in the memory device 213. The memory 215b may store a primary queue 330 described later.

The media driver device 216 is a device that outputs data in the main memory 212 or the memory device 213 to portable recording media such as a floppy disk, an MO disk, a CD-R or a DVD-R, or reads out programs and data from those portable recording media.

The storage device 220 includes an active controller 230 and a queue controller 240. The active controller 230 and the queue controller 240 are connected via an internal bus 221 and may exchange data with each other.

The active controller 230 and the queue controller 240 may be used differently by using a delay flag set in a service level management table 400 described later in FIG. 4. For example, the active controller 230 may transfer an I/O request to the queue controller 240 only when the delay flag is ON.

The active controller 230 includes a processor 231, a cache memory 232, a flash memory 233, a network I/F 234, a storage I/F 235, and a media driver device 236. These devices are connected to a bus and are able to exchange data with each other.

The processor 231 is a computing device that executes programs to realize storage control according to the present embodiment, such as a service level synchronization program and an I/O control program stored in the flash memory 233, in addition to executing programs for controlling a memory device 222.

The cache memory 232 is a volatile storage device that is used for storing programs executed by the processor 231 and portions of data stored in the secondary queue 340 described later and in the memory device 222. A RAM, for example, may be used for the cache memory 232.

The flash memory 233 is a non-volatile storage device for storing programs to realize storage control according to the present embodiment in addition to programs and data that are needed for operation of the active controller 230.

As examples, the service level management table, a virtual server management table, a service level synchronization program, and an I/O control program may be stored in the flash memory 233. The active controller 230 may be able to obtain the service level management table or the virtual server management table from the system management server 250 at the time of startup, for example, and store it in the flash memory 233.

It should be noted that the service level synchronization program is a program to realize the processing illustrated in FIG. 13, which is described later. The I/O control program is a program to realize processing illustrated in FIG. 14A to FIG. 14C, which are described later.

The network I/F 234 is a device to make a connection to the network 260.

The I/F port 235 is an I/F that communicates with the storage I/F 215 in accordance with a particular standard.

The media driver device 236 is a device to output data of the cache memory 232 or the flash memory 233 to a portable recording media such as a floppy disk, an MO disk, a CD-R or a DVD-R, or reads out programs and data from those portable recording media.

The queue controller 240 may include the same configuration as the configuration of the active controller 230. For example, a processor 241, a cache memory 242, and a flash memory 243 that are provided in the queue controller 240 may be the same devices as those of the processor 231, the cache memory 232, and the flash memory 234, respectively, provided in the active controller 230. Similarly, a network I/F 244, an I/F port 245, and a media driver device 246 that are provided in the queue controller 240 may be the same devices as those of the network I/F 234, the I/F port 235, and the media driver device 236, respectively, provided in the active controller 230. Therefore, the descriptions of the queue controller 240 are omitted.

The system management server 250 is an information processor device including a processor 251, a main memory 252, a memory device 253, a network I/F 254, and a media driver device 255. These devices are connected to a bus and are able to exchange data with each other. This system management server 250, however, is not limited to being a single independent information processor device. The system management server 250 may be for example realized by a virtual server 311, described later, provided by the physical server 210.

The processor 251, the main memory 252, and the memory device 253 that are provided in the system management server 250 may be the same devices as those of the processor 211, the main memory 212, and the memory device 213, respectively, provided in the physical server 210. Similarly, the network I/F 254 and the media driver device 255 that are provided in the system management server 250 may be the same devices as those of the network I/F 214 and the media driver device 216, respectively, provided in the physical server 210. Therefore, detailed descriptions of the processor 251, the main memory 252, the memory device 253, the network I/F 254, and the media driver device 255 are omitted.

It should be noted that the memory device 253 may store, for example, a service level management table, a virtual server management table, a management program for the service level management table, and a management program for the virtual server management table. The management program for the service level management table is a program to realize the processing illustrated in FIG. 11, which is described later. The management program for the virtual server management table is a program to realize the processing illustrated in FIG. 12, which is described later.

It should also be noted that non-transitory media may be used for the main memories 212, 252, the memory 215c, the memory devices 213, 253, and the cache memories 232, 242, the flash memories 233, 243, and recording media that may be read by information processor devices such as portable recording media.

FIG. 3 is a diagram describing an overview of the storage system 200.

The physical server 210 provides a VMM (Virtual Machine Monitor) 310 by executing a prescribed program. This VMM 310 may provide either one or two or more virtual servers (VM: Virtual Machine) 311. FIG. 3 illustrates an example in which the VMM 319 provides three virtual servers 311 VM01 to VM03. This, however, is not intended to limit the number of the virtual servers 311 provided by the VMM 310. In the following description, (1) to (12) correspond to (1) to (12), respectively, in FIG. 3.

(1) When receiving an I/O request from a virtual server 311, the VMM 310 transfers the I/O request to the storage I/F 215. The storage I/F 215 stores the I/O request received from the VMM 310 in a temporary queue 320 in which input/output queues are provided for each of the virtual servers 311.

Although an example in which three temporary queues 321, 322, and 323 are used is illustrated in FIG. 3, this is not intended to limit the number of temporary queues 320 used. The temporary queue 321 is a queue that stores the I/O request received from the VM01 and stores a response to be output to the VM01. The temporary queue 322 is a queue that stores the I/O request received from the VM02 and stores a response to be output to the VM02. The temporary queue 323 is a queue that stores the I/O request received from the VM03 and stores a response to be output to the VM03. It should be noted that COM01, 02, . . . in FIG. 3 represent I/O requests, and STS01, 02, . . . in FIG. 3 represent responses to the I/O requests.

(2) The storage I/F 215 extracts an I/O request stored in the temporary queue 320. The storage I/F 215 stores the extracted I/O request in the primary queue 330. The primary queue 330 includes a primary queue 331 that stores the I/O request and a primary queue 332 that stores a response to the I/O request.

The primary queue 331 is a queue that stores an I/O request for each service level of the virtual server 311, which is a request source of the I/O request. A detailed example of the primary queue 331 is described later with reference to FIG. 6. Because the primary queue 332 is a single queue realized by a FIFO (First-In First-Out) data structure, the description of the primary queue 332 is omitted.

(3) For each request source virtual server 311, the storage I/F 215 extracts from the primary queue 331 as many I/O requests as the number of I/O requests that is determined on the basis of the service level of the request source virtual server 311, and issues the I/O requests to the storage device 220. However, in a case of I/O requests from the virtual server 311 that has an I/O control number other than 0 set to the virtual server management table 500, which is described later in FIG. 5, the number of I/O requests that the storage I/F 215 issues is obtained by subtracting the I/O control number from the number of I/O requests that is determined on the basis of the service level of the request source virtual server 311.

The storage I/F 215 calculates an amount of transfer data per second for every prescribed time period. When the calculated amount of transfer data exceeds the performance limit of the service level management table 400, the storage I/F 215 calculates the I/O control number based on the exceeded amount. Then, the storage I/F 215 sets in the virtual server management table 500 the calculated I/O control number for the virtual server 311 which exceeded the performance limit.

(4) The active controller 230 in the storage device 220 stores the I/O request received from the physical server 210 in the secondary queue 340. The secondary queue 340 includes a secondary queue 341 that stores I/O requests and a secondary queue 342 that stores execution results of the I/O requests.

The secondary queue 341 is a queue that stores I/O requests for each service level of the virtual servers 311 that are request sources of the I/O requests. A specific example of the secondary queue 341 is described later in FIG. 7. The secondary queue 342 is a single queue realized by a FIFO data structure which is similar to the primary queue 332, and therefore detailed descriptions are omitted.

(5) For each request source virtual server 311, the active controller 230 extracts from the secondary queue 342 as many I/O requests as the number of I/O requests that is determined on the basis of the service level of the request source virtual server 311, and executes the I/O requests. The active controller 230 stores the execution results of the I/O requests in the secondary queue 342. The active controller 230 also extracts a response form the secondary queue 342 and transmits the response to the physical server 210.

The active controller 230 and the queue controller 240 calculate an average of responding time periods from receiving I/O requests to returning responses, or an average responding time, for every prescribed time period. The active controller 230, for example, detects that the average responding time exceeds a handover level set in the service level management table 400. In such a case, the active controller 230 sets ON the delay flag in the service level management table 400 that corresponds to the service level of the virtual server 311, which is a request source of the I/O request for which the average responding time exceeds the handover level.

When the average responding time becomes a recovery level in the service level management table 400, the active controller 230 and the queue controller 240 detect that the average responding time becomes the recovery level or lower. In such a case, the active controller 230 and the queue controller 240 set the delay flag to OFF in the service level management table 400 that corresponds to the service level of the virtual server 311, which is a request source of the I/O request.

(6) Meanwhile, when the delay flag is set to ON in the service level management table 400, the active controller 230 transfers to the queue controller 240 the I/O request received from the virtual server 311 of the service level for which the delay flag is set to ON.

(7) The queue controller 240 stores the I/O request received from the active controller 230 in the secondary queue 350. Because the same configuration as the configuration of the secondary queue 340 may be used for the secondary queue 350, the descriptions are omitted.

(8) For each request source virtual server 311, the queue controller 240 extracts from the secondary queue 351 as many I/O requests as the number of I/O requests that is determined on the basis of the service level of the request source virtual server 311, and executes the I/O requests. Then the queue controller 240 stores the execution results of the I/O requests in the secondary queue 352.

(9) The queue controller 240 extracts a response from the secondary queue 352 and outputs the response to the active controller 230. The active controller 230 outputs the response received from the queue controller 240 to the physical server 210.

(10) When receiving the response from the storage device 220, the storage I/F 215 stores the received response in the primary queue 332. Then, (11) the storage I/F 215 extracts a response from the primary queue 332 and stores the extracted response in the temporary queue 320. The storage I/F 215 extracts the response from the temporary queue 320 and outputs the response to the VMM 310.

(12) The VMM 310 transfers the response received from the storage I/F 215 to any of the virtual servers VM01 to VM03.

FIG. 4 is a diagram illustrating an example of the service level management table 400.

The service level management table 400 may include information of a service level, an I/O priority number, a performance limit, an average I/O response time period, a handover level, a recovery level, and a delay flag.

The service level is a service priority set for each virtual server 311. In the present embodiment, three types, "high", "medium", and "low", are used. A "high" service level has the highest priority and "medium" is the next-highest priority. A "low" service level is the lowest priority.

The I/O priority number is an upper limit value of the number of I/O issues executed at once, determined for each service level.

The performance limit may include a performance limit of write processing and a performance limit of read processing. The performance limit is the upper limit of the amount of transfer data (MB/S) allowed for each service level.

The average I/O response time period is an average time period (ms) needed to execute I/O requests of the virtual server 311. For example, the physical server 210 may calculate an average of time periods from issuing I/O requests to receiving the responses as an average I/O response time period. The storage device 220 may calculate an average of time periods from receiving I/O requests to outputting the responses to the I/O requests as an average I/O response time period.

The handover level is a threshold value to determine whether or not to shift a normal mode in which the active controller processes all of the received I/O requests to a load distribution mode in which a portion of processing of the I/O requests received by the active controller is handed over to the queue controller. The handover level may be represented by a fraction with respect to the average I/O response time period.

The recovery level is a threshold value to determine whether or not to shift the load distribution mode back to the normal mode. Similarly to the handover level, the recovery level may be also represented by a fraction with respect to the average I/O response time period.

The delay flag is a flag to determine whether the active controller or the queue controller is used to execute the received I/O request. When the delay flag is OFF, the active controller executes the received I/O request. When the delay flag is ON, the queue controller executes the received I/O request.

FIG. 5 is a diagram illustrating an example of the virtual server management table 500.

The virtual server management table 500 may include information of a physical server 210, a virtual server, an identifier, a service level, an average I/O processing time period (physical server), an amount of transfer data, an I/O control number, and an average I/O processing time period (storage device).

The physical server 210 is identification information to identify the physical server.

The virtual server is a unique ID assigned to the virtual server 311 operating on the physical server 210.

The identifier is information that allows the storage device 220 to identify the virtual server 311 that is a request source of the received I/O request.

The service level is a service level assigned to the virtual server 311.

The average I/O processing time period (physical server) is an average time period (ms) needed to complete the processing in response to the I/O request of the virtual server 311. For this average I/O processing time period (physical server), for example, an average value of the time period from a point in time when the physical server 210 that received an I/O request from the virtual server 311 issues the I/O request to the storage device 220 to a point in time when the physical server 210 receives a response to the I/O request from the storage device 220 may be used.

The amount of transfer data may include an amount of data transfer (MB/s) when the processing of the I/O request is write processing and an amount of data transfer (MB/s) when the processing of the I/O request is read processing.

The I/O control number is a number to which the number of the I/O requests issued a next time is limited in the virtual server 311 that has a data transfer amount that exceeds the performance limit provided in the service level management table 400. An integer of 0 or larger may be used for the I/O control number.

The average I/O processing time period (storage device) is an average time period (ms) needed to complete the processing in response to the I/O request of the virtual server 311. For this average I/O processing time period (storage device), for example, an average time period from a point in time when the storage device 220 receives an I/O request to a point in time when the storage device 220 transmits a response to the I/O request to the physical server 210 may be used.

FIG. 6 is a diagram illustrating an example of the primary queue 331 provided in the physical server 210.

The primary queue 331 includes a high-level queue 331a, a middle-level queue 331b, and a low-level queue 331c. In the following descriptions, the high-level queue 331a, the middle-level queue 331b, and the low-level queue 331c, or a high-level queue 341a, a middle-level queue 341b, and a low-level queue 341c described later in FIG. 7, are collectively referred to as "queues for each level".

The high-level queue 331a is a queue to store I/O requests received from the virtual server 311 that has its service level set to "high". The middle-level queue 331b is a queue to store I/O requests received from the virtual server 311 that has its service level set to "middle". The low-level queue 331c is a queue to store I/O requests received from the virtual server 311 that has its service level set to "low".

The high-level queue 331a, the middle-level queue 331b, and the low-level queue 331c are each provided with an individual queue for each virtual server 311, which stores only the I/O request received from the particular virtual server 311. The individual queue may be realized by the FIFO data structure. FIG. 6 illustrates the high-level queue 331a including an individual queue 511 that stores I/O requests received from the virtual server VM01, and an individual queue 512 that stores I/O requests received from the virtual server VM04 as an example.

Figure 7:
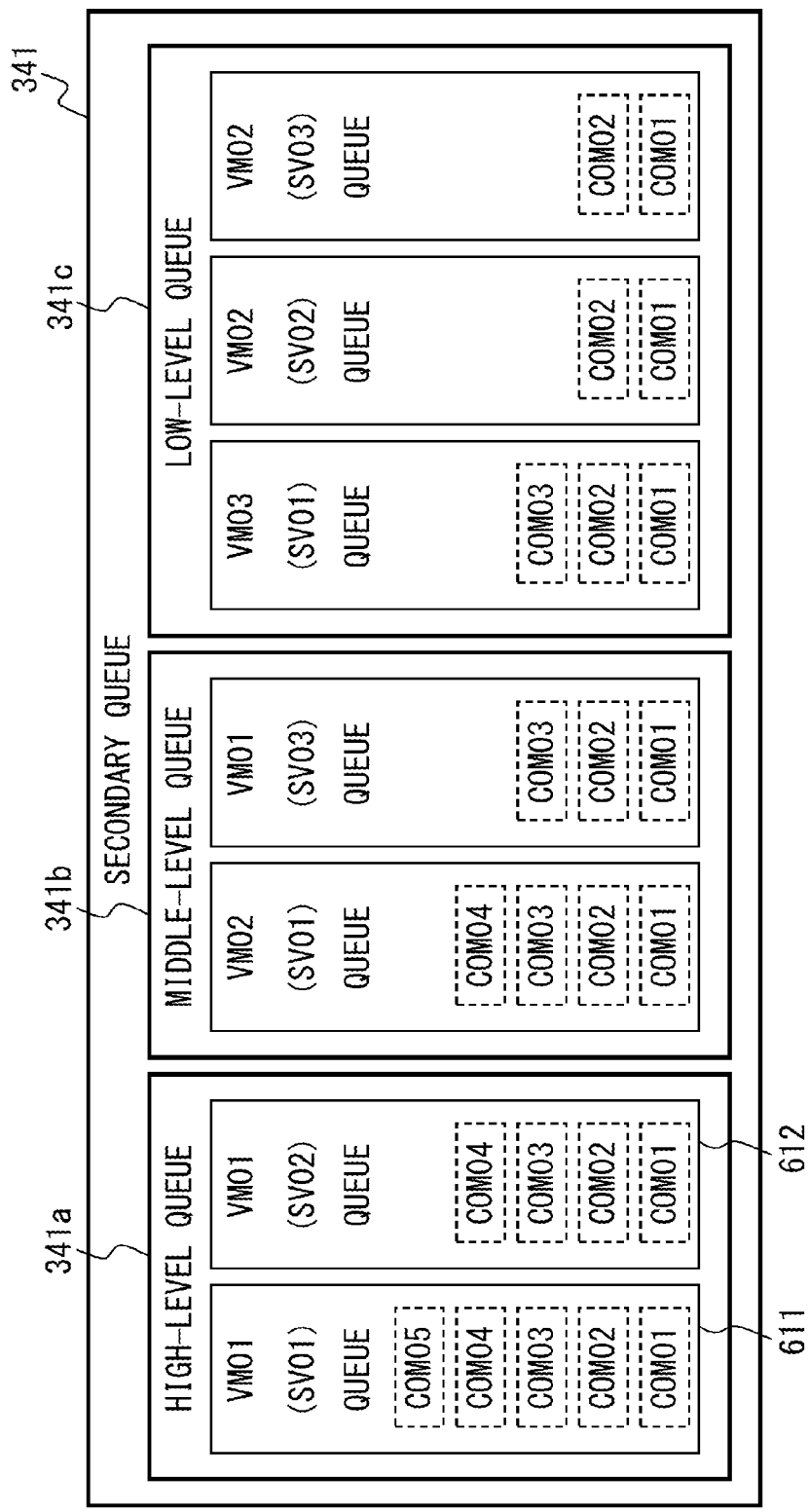
FIG. 7 is a diagram illustrating an example of a secondary queue 341 provided in a storage device.

FIG. 7 is a diagram illustrating an example of the secondary queue 341 provide in the storage device 220.

Similarly to the primary queue 331, the secondary queue 341 includes the high-level queue 341a, the middle-level queue 341b, and the low-level queue 341c.

The high-level queue 341a is a queue that stores I/O requests from a request source that is a virtual server 311 having the service level set to "high".

The middle-level queue 341b is a queue that stores I/O requests from a request source that is a virtual server 311 having the service level set to "middle". The low-level queue 341c is a queue that stores I/O requests from a request source that is a virtual server 311 having the service level set to "low".

The high-level queue 341*a*, the middle-level queue 341*b*, and the low-level queue 341*c* are each provided with an individual queue for each virtual server 311, which stores only the I/O request received from the particular virtual server 311. The individual queue may be realized by the FIFO data structure. FIG. 7 illustrates a high-level queue 341*a* including an individual queue 611 that stores I/O requests from a request source that is the virtual server VM01 operating in the physical server SV01, and an individual queue 612 that stores I/O requests from a request source that is the virtual server VM01 operating in the physical server SV02 as an example.

FIG. 8 is a diagram illustrating an example of an I/O request packet 800 transmitted by the virtual server 311.

For the I/O request packet 800, a packet of an IEEE (The Institute of Electrical and Electronic Engineers) 802.1 compliant format, for example, may be used.

In such a case, the I/O request packet 800 may include information of a destination MAC (Media Access Control) address, a source MAC address, a tag header, a type, data and an FCS (Frame Check Sequence).

The tag header may include a TPID (Tag Protocol Identifier) and TCI (Tag Control Information). The TCI may include PCP (Priority Code Point), CFI (Canonical Format Indicator), and VLAN ID information.

The identifier of the virtual server 311 illustrated in FIG. 5 may be set to the VLAN ID. It should be noted that because the I/O request packet 800 illustrated in FIG. 8 is a packet of an IEEE 802.1 compliant format, explanations of the information included in the I/O request packet 800 other than the VLAN ID are omitted. However, this does not limit the I/O request packet 800 to having an IEEE 802.1 compliant format, but the format of the I/O request packet 800 may be determined in advance as the need arises.

Figure 9:
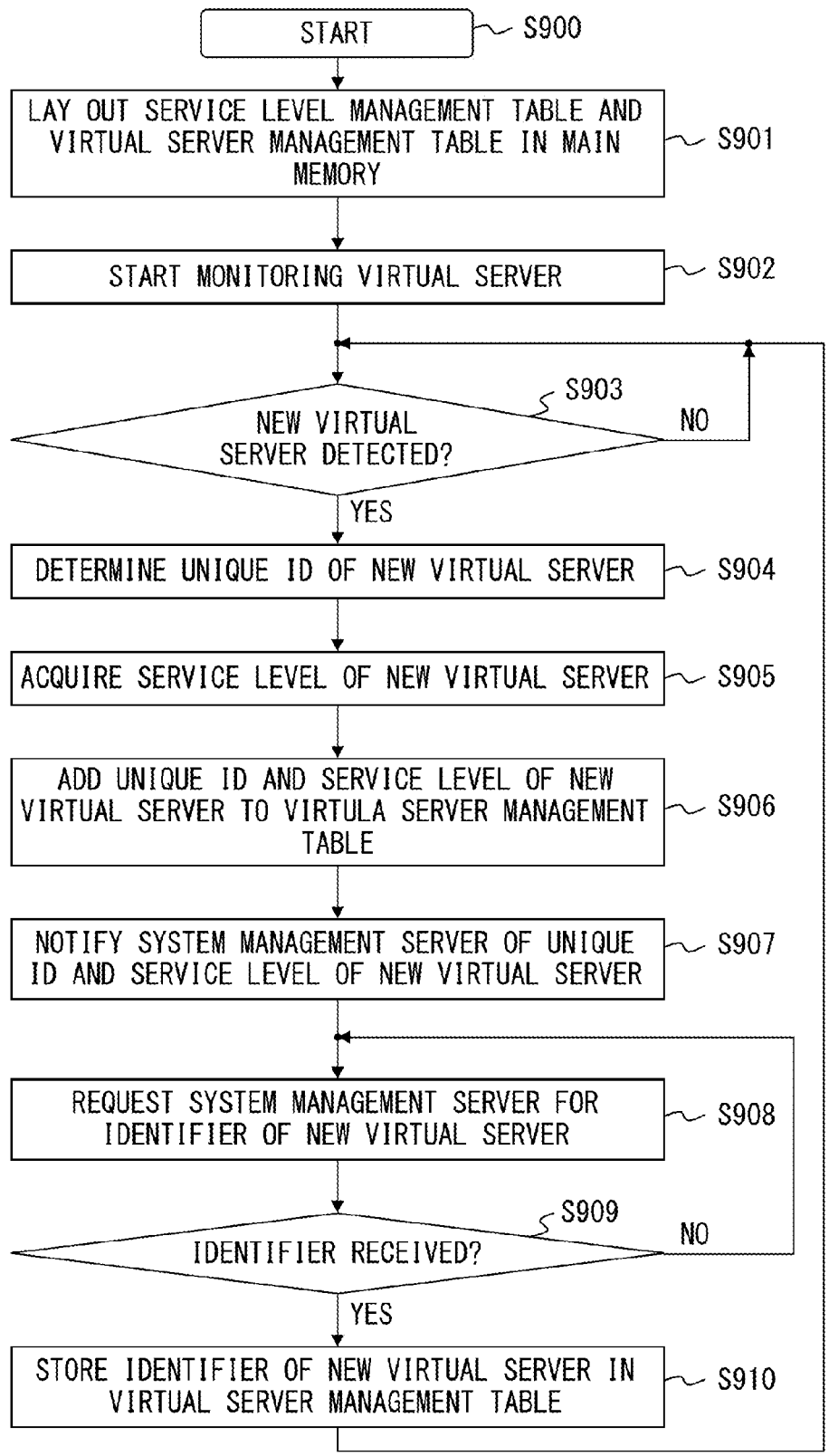
FIG. 9 is a flowchart illustrating monitoring processing of the virtual server performed by the physical server 210.

FIG. 9 is a flowchart illustrating processing to monitor the virtual server 311 performed by the physical server 210.

The physical server 210, upon its startup (step S900), reads out the service level management table 400 and the virtual server management table 500 from the memory device 213 and lays these tables out on the main memory 212 (step S901). The physical server 210 starts monitoring a newly started virtual server 311 (step S902 NO). The newly started virtual server 311 is hereinafter referred to as a "new virtual server".

When a new virtual server is detected (Step S903 YES), the physical server 210 determines a unique ID assigned to the detected new virtual server (step S904). The physical server 210 may automatically determine the unique ID of the virtual server 311 in a sequence such as VM01, VM02, VM03, . . . , as illustrated in FIG. 5.

The physical server 210 then outputs a display to prompt a user to set the service level of the new virtual server on the display device, which is not illustrated. When it is detected that the user has input a service level of the new virtual server by operating an input device, the physical server 210 obtains the input service level (step S905).

The physical server 210 adds the unique ID determined in step S904 and the service level acquired in step S905 of the new virtual server, together with the identification information of the physical server 210, to the virtual server management table 500 of the main memory 212 (step S906).

The physical server 210 notifies the system management server 250 of the unique ID of the new virtual server determined in step S904 and the service level of the new virtual server acquired in step S905, together with the identification information of the physical server 210 (step S907). The physical server 210 requests for an identifier of the new virtual server from the system management server 250 (step S908).

Afterwards, the physical server 210 waits for reception of the identifier of the new virtual server from the system management server 250 (step S909 NO).

When the identifier of the new virtual server is received from the system management server 250 (step S909 YES), the physical server 210 stores the received identifier in the virtual server management table 500 of the main memory 212 (step S910). The physical server 210 reflects the change in the virtual server management table 500 of the main memory 212 in the virtual server management table 500 of the memory device 213, and shifts the processing to step S903.

Figure 10B:
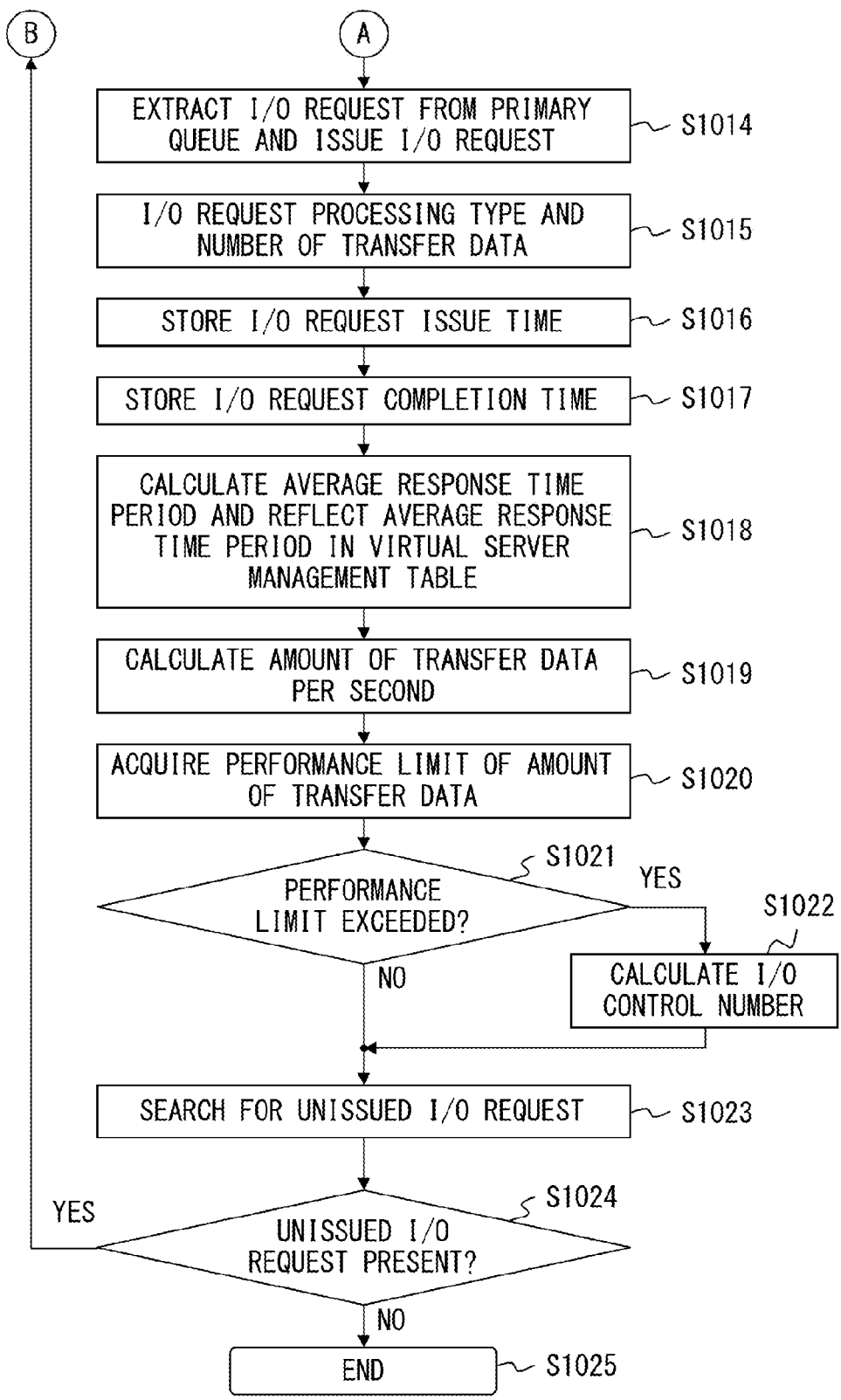
FIG. 10B is a flowchart illustrating execution processing of an I/O request performed by the physical server 210.

FIG. 10A and FIG. 10B are a flowchart describing processing of I/O request execution by the physical server 210. In the present embodiment, although the storage I/F 215 performs the processing in FIG. 10A and FIG. 10B, this processing may be performed by causing a processor 211 in the physical server 210 to execute a prescribed program. The following description explains the processing with "physical server 210" as the subject of the processing.

The physical server 210 starts measuring a prescribed period of time by starting up a timer (step S1001).

When an I/O request is received from the virtual server 311 (step S1002), the physical server 210 refers to the virtual server management table 500 stored in the main memory 212. The physical server 210 then acquires an identifier and a service level of the virtual server 311 that is a request source of the I/O request (step S1003). In the following description of the processing, the virtual server 311 that is the request source of the I/O request received in step S1002 is referred to as a "target virtual server".

The physical server 210 sets the identifier of the target virtual server acquired in step S1003 at a prescribed position of the I/O request packet received in step S1002, which is for example a position of the VLAN ID illustrated in FIG. 8 (step S1004).

The physical server 210 generates an individual queue of the target virtual server in a queue corresponding to the service level acquired in step S1003 from among the high-level queue, the middle-level queue, and the low-level queue included in the primary queue 331 (step S1005). However, if an individual queue of the target virtual server has already existed, the physical server 210 skips the processing in step S1005 and shifts the processing to step S1006.

The physical server 210 then stores the I/O request in the individual queue generated in step S1005 included in the queue corresponding to the service level acquired in step S1003 (step S1006).

The physical server 210 refers to the timer started in step S1001 and acquires an elapsed time from a prescribed point in time (step S1007).

When the elapsed time acquired in step S1007 is less than a certain time period (step S1008 NO), the physical server 210 shifts the processing to step S1002. The physical server 210 then repeats the processing from step S1002 to S1008.

When the elapsed time acquired in step S1007 reaches a certain time period or more (step S1008 YES), the physical server 210 ends the time measurement and shifts the processing to step S1009. The physical server 210 calculates the number of I/O requests that may be executed by virtual servers 311 for each service level (step S1009).

The physical server 210 may calculate the number of the I/O requests that may be executed by the virtual servers 311 for each service level based on the number of virtual servers 311, which operate in the physical server 210, for each service level. A case under the following conditions is explained as an example.

The maximum I/O processing number in the interface: 100,000 IOPS

The number of virtual servers 311 with a "high" service level: 2

The number of virtual servers 311 with a "middle" service level: 5

The number of virtual servers 311 with a "low" service level: 2

The number of I/O priority numbers for each service level: I/O priority number in FIG. 4

Note that the maximum I/O processing number is a maximum value of the number of I/Os that may be processed at once by an interface with the storage device 220 implemented in the physical server 210. The interface includes the storage I/F 215 such as the HBA of Fiber Channel and the NIC of iSCSI. The maximum I/O processing number may be stored in the memory device 213 in advance. "IOPS" denoted in the present embodiment is a unit representing the number of I/O requests processed in a unit of time.

(1) The physical server 210 firstly refers to the service level management table 400 stored in the main memory 212, and acquires the I/O priority number for each service level. In the present embodiment, the I/O priority number of a "high" service level is "4", the I/O priority number of a "middle" service level is "2", and the I/O priority number of a "low" service level is "1".

(2) Next, the physical server 210 acquires the number of virtual servers 311, which operates in the physical server 210, for each service level. The number of virtual servers 311 for each service level may be acquired from, for example, the virtual server management table 500 stored in the main memory 212. In the present embodiment, from among the virtual servers 311 that operate in the physical server 210, the number of the virtual servers 311 with a "high" service level is 2, the number of the virtual servers 311 with a "middle" service level is 5, and the number of the virtual servers 311 with a "low" service level is 2.

(3) The physical server 210 then calculates an I/O assignment constant. The physical server 210 may calculate the I/O assignment constant by using the following equation.

"I/O assignment constant"="maximum I/O processing number in interface"÷("I/O priority number with "high" service level"×"number of virtual servers 311 with "high" service level"+"I/O priority number with "middle" service level"×"number of virtual servers 311 with "middle" service level"+ "I/O priority number with "low" service level"× "number of virtual servers 311 with "low" service level")  (1)

Accordingly, in the case of the present embodiment, the physical server 210 may calculate the I/O assignment constant as 5,000 IOPS (=100,000 IOPS÷(4IO×2+2IO×5+1IO× 2)). Note that "IO" denoted in the present embodiment indicates the I/O processing number.

(4) The physical server 210 calculates the number of I/O requests that may be executed by the virtual server 311 for each service level. The physical server 210 may calculate the number of I/O request that may be executed by the virtual servers 311 for each service level by using the following equation.

"Number of I/O requests that may be executed by virtual servers 311 for each service level"="I/O assignment constant"×"I/O priority number for each service level"  (2)

Accordingly, in the case of the present embodiment, the physical server 210 may calculate the number of I/O requests that may be executed by the virtual servers 311 with a "high" service level as 20,000 IO (=4IO×5,000IOPS). The physical server 210 may calculate the number of I/O requests that may be executed by the virtual servers 311 with a "middle" service level as 10,000 IO (=2IO×5,000IOPS). The physical server 210 may calculate the number of I/O requests that may be executed by the virtual servers 311 with a "low" service level as 5,000 IO (=1IO×5,000IOPS).

When the number of I/O requests that may be executed by the virtual server 311 for each service level is calculated, the physical server 210 selects an arbitrary virtual server 311 from among the virtual servers 311 for which I/O requests are stored in the primary queue 331 (step S1010). In the following description of processing, the selected virtual server 311 is referred to as a "selected virtual server".

Note that the selection of the virtual server 311 is performed in an order of a virtual server 311 for which I/O requests are stored in the high level queue 331a, a virtual server 311 for which I/O requests are stored in the middle level queue 331b, and a virtual server 311 for which I/O requests are stored in the low level queue 331c. If there are multiple virtual servers 311 for which I/O requests are stored in the high level queue 331a, after selecting all of these virtual servers 311, a virtual server 311 for which I/O requests are stored in the middle level queue 331b is selected.

The physical server 210 refers to the virtual server management table 500 stored in the main memory 212 and confirms whether to not an I/O control number other than 0 is set in the selected virtual server (step S1011). For the I/O control number of the present embodiment, 0 is set as an initial value.

When an I/O control number other than 0 is set to the selected virtual server (step S1012 YES), the physical server 210 shifts the processing to step S1013. In such a case, the physical server 210 subtract the I/O control number from the number of I/O requests calculated in step S1009 (step S1013). For example, when the service level of the selected virtual server is "high" in the example of step S1009, the physical server 210 subtract the I/O control number from 20,000 IO. The physical server 210 shifts the processing to step S1014. When the I/O control number is set to be 0 in the selected virtual server (step S1012 NO), the physical server 210 shifts the processing to step S1014.

The physical server 210 extracts as many of the I/O requests of the selected virtual server as are calculated in step S1009, or the number of I/O requests calculated in step S1013 if the processing in step S1013 is performed. The physical server 210 issues the extracted I/O request to the storage device 220 (step S1014).

The physical server 210 stores a type of processing and the number of pieces of transfer data of the I/O requests issued in step S1014 in a prescribed region of the main memory 212 (step S1015). The type of processing of the I/O requests is processing such as write processing or read processing requested in the I/O requests. The number of pieces of transfer data of the I/O requests is the number of pieces of data that are to undergo write processing when the type of processing of the I/O requests is write processing or the number of pieces of transfer data of the I/O requests is the number of pieces of data that is to undergo read processing when the type of processing of the I/O requests is read processing. The type of processing and the number of pieces of transfer data of the I/O requests may be acquired from the header portion of an I/O request packet.

Furthermore, the physical server 210 stores the issue time at which an I/O request is issued in step S1014 in a prescribed region of the main memory 212 (step S1016). When the execution of the issued I/O request is completed, or in other words when a response to the I/O request is received from the storage device 220, the physical server 210 stores the time point at which the response is received in a prescribed region of the main memory 212 as a completion time of the I/O request (step S1017).

The physical server 210 calculates a response time for each of the I/O requests for which responses are received from the storage device 220 from among the I/O requests issued in step S1014 from the difference between the issue time stored in step S1016 and the completion time stored in step S1017. The physical server 210 then calculates an average response time of I/O requests for which responses are received from the storage device 220 from among the I/O request issued in step S1014 from the calculated response times (step S1018). The physical server 210 stores the calculated average response time as an average I/O processing time period (physical server) in the virtual server management table 500 stored in the main memory 212.

The physical server 210 calculates the sum of the amount of transfer data for the I/O requests for which responses are received from the storage device 220 from among the I/O requests issued in step S1014. The physical server 210 calculates the sum of response times for the I/O requests for which responses are received from the storage device 220 from among the I/O requests issued in step S1014. The physical server 210 calculates an amount of transfer data per second by dividing the sum of the amount of transfer data by the sum of the response time (step S1019). The physical server 210 also stores the calculated amount of transfer data per second as the amount of transfer data in the virtual server management table 500 stored in the main memory 212.

The physical server 210 refers to the service level management table 400 stored in the main memory 212, and acquires the performance limit corresponding to the service level of the selected virtual server (step S1020). When the amount of data transfer per second calculated in step S1019 exceeds the performance limit acquired in step S1020 (step S1021 YES), the physical server 210 calculates an I/O control number (step S1022). The physical server 210 may calculate the I/O control number by using the following equation (3).

"I/O control number"=("amount of transfer data $A$"−"performance limit $B$")÷("amount of transfer data $C$"÷"number of I/O request $D$")     (3)

Here, in the above equation (3), the amount of transfer data A is an amount of transfer data per second calculated in step S1019. The performance limit B is a performance limit set in the service level management table 400 stored in the main memory 212. The amount of transfer data C is the sum of the amounts of transfer data of the I/O requests for which responses are received from the storage device 220 from among the I/O requests issued in step S1014. The number of I/O requests D is the number of I/O requests for which responses are received from the storage device from among the I/O requests issued in step S1014.

When calculating the I/O control number, the physical server 210 shifts the processing to step S1023. In a case in which the amount of data transfer per second calculated in step S1019 does not exceed the performance limit acquired in step S1020 (step S1021 NO), the physical server 210 shifts the processing to step S1023.

When there is an unissued I/O request in the primary queue 331 (steps S1023 and S1024, YES), the physical server 210 shifts the processing to step S1010. When no unissued I/O request is found in the primary queue 331 (steps S1023 and S1024, NO), the physical server 210 terminates the processing of I/O request execution (step S1025).

The processing to monitor the service level management table 400 performed by the physical server 210 is the same as that of the storage device 220. The processing to monitor the service level management table 400 performed by the storage device 220 is described later in FIG. 13.

Note that although the I/O control number is calculated when the amount of data transfer per second exceeds the performance limit in step S1022, the I/O control number may be calculated when the average I/O processing time period (physical server) exceeds the average I/O response time of the service level management table 400, for example.

FIG. 11 is a flowchart describing processing to monitor the service level management table 400 by the system management server 250.

The system management server 250, upon its startup (step S1200), reads out the service level management table 400 from the memory device 253. The system management server 250 lays the readout service level management table 400 out in a prescribed region of the main memory 252 (step S1201).

The system management server 250 monitors changes in the service level management table 400 stored in the memory device 253 (steps S1202 and S1203, NO). In this case, for example, the system management server 250 regularly reads out the service level management table 400 from the memory device 253, and compares this table with the service level management table 400 laid out in the prescribed region of the main memory 252 in step S1201. When there is a difference between the service level management table 400 read out from the memory device 253 and the service level management table 400 laid out in the prescribed region of the main memory 252, the system management server 250 determines that the service level management table 400 has been changed.

When the service level management table 400 stored in the memory device 253 has been changed (step S1202 YES), the system management server 250 reflects changed items in the service level management table 400 laid out in the prescribed region of the main memory 252 (step S1204). The system management server 250 notifies the physical server 210 and the storage device 220 of the changed items in the service level management table 400. The physical server 210 that received the notice reflects the changed items in the service level management table 400 laid out in the prescribed region of the main memory 212. In a similar manner, the storage device 220 that received the notice reflects the changed items in the service level management table 400 laid out in the prescribed region of the cache memory 232.

When the above processing is completed, the system management server 250 shifts the processing to step S1203, and repeats the processing from step S1202 to step S1204.

FIG. 12 is a flowchart describing processing to monitor the virtual server management table 500 performed by the system management server 250.

The system management server 250, upon its startup (step S1300), reads out the virtual server management table 500 from the memory device 253. The system management server 250 lays the read out virtual server management table 500 out in a prescribed region of the main memory 252 (step S1301).

The system management server 250 then confirms whether or not a unique ID and a service level of a new virtual server have been received from the physical server 210 (steps S1302 and S1303 NO).

When the unique ID and the service level of the new virtual server have been received from the physical server 210 (step S1303 YES), the system management server 250 shifts the processing to step S1304. In such a case, the system management server 250 adds a table region of the new virtual server in the virtual server management table 500 stored in the main memory 252 (step S1304).

The system management server 250 then reflects the unique ID and the service level of the new virtual server received from the physical server 210 in step S1302 in the table region of the new virtual server added in step S1304 (step S1305).

The system management server 250 generates an identifier of the new virtual server (step S1306). The system management server 250 may generate an identifier by adding a two-digit number to a letter string "vLAN" in such a manner as "vLAN01", "vLAN02" . . . , as an example.

The system management server 250 refers to the virtual server management table 500 stored in the main memory 252 and searches for an identifier that is identical with the identifier generated in step S1306 (step S1307).

When an identifier that is identical with the identifier generated in step S1306 has already been used in the virtual server management table 500, the system management server 250 determines that the identifier is redundant (step S1308 YES) and shifts the processing to step S1309. The system management server 250 generates a new identifier for the new virtual server (steps 1309). The system management server 250 then shifts the processing to step S1307.

When an identifier that is identical with the identifier generated in step S1306 has not been used in the virtual server management table 500, the system management server 250 determines that the identifier is not redundant (step S1308 NO) and shifts the processing to step S1310. The system management server 250 reflects the identifier generated in step S1306 or S1309 in the virtual server management table 500 stored in the main memory 252 (step S1310). The system management server 250 reflects the change of the virtual server management table 500 of the main memory 252 in the virtual server management table 500 of the memory device 253.

The system management server 250 notifies the physical server 210 of the identifier generated in step S1306 or S1309 (step S1311). The system management server 250 notifies the storage device 220 of update information including updates in the virtual server management table 500 stored in the cache memory 232 (step S1312). This update information may include a unique ID and a service level of a new virtual server received form the physical server 210 and an identifier of the new virtual server generated in step S1306 and S1309, for example.

When the above processing is completed, the system management server 250 shifts the processing to step S1302.

FIG. 13 is a flowchart describing processing to monitor the service level management table 400 performed by the storage device 220.

The storage device 220, upon its startup (step S1400), reads out the service level management table 400 from the flash memory 233. The storage device 220 then lays the readout service level management table 400 out in the prescribed region of the cache memory 232 (step S1401).

The storage device 220 confirms whether or not the changed items in the service level management table 400 have been received from the system management server 250 (steps S1402 and S1403, NO).

When the changed items in the service level management table 400 have been received from the system management server 250 (step S1403 YES), the storage device 220 shifts the processing to step S1404. In such a case, the storage device 220 reflects the items changed in the service level management table 400 in the service level management table 400 stored in the processing region of the cache memory 232 and the service level management table 400 stored in the flash memory 232. The storage device 220 shifts the processing to step S1402.

Figure 14A:
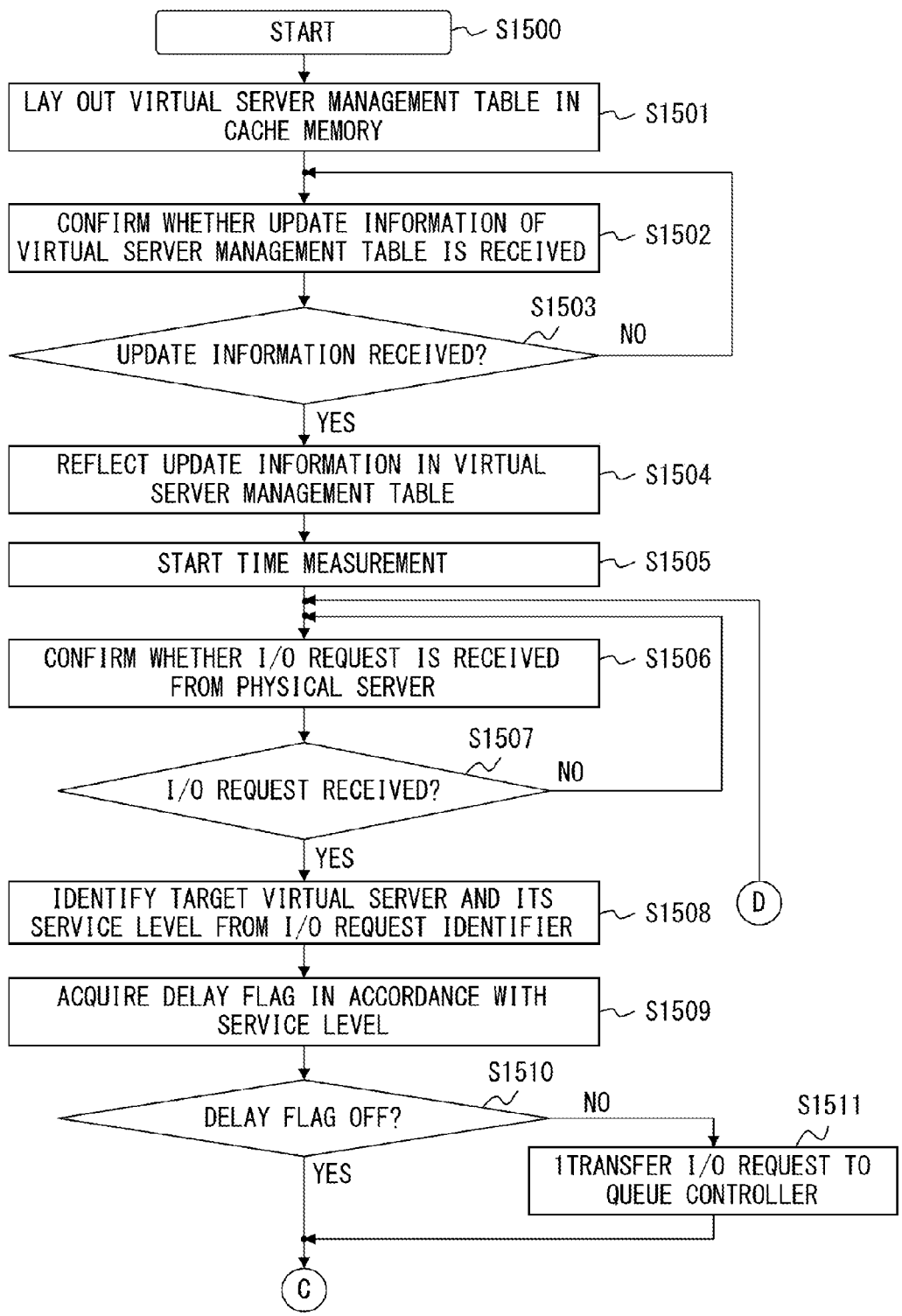
FIG. 14A is a flowchart illustrating execution processing of an I/O request performed by the storage device 220.
Figure 14B:
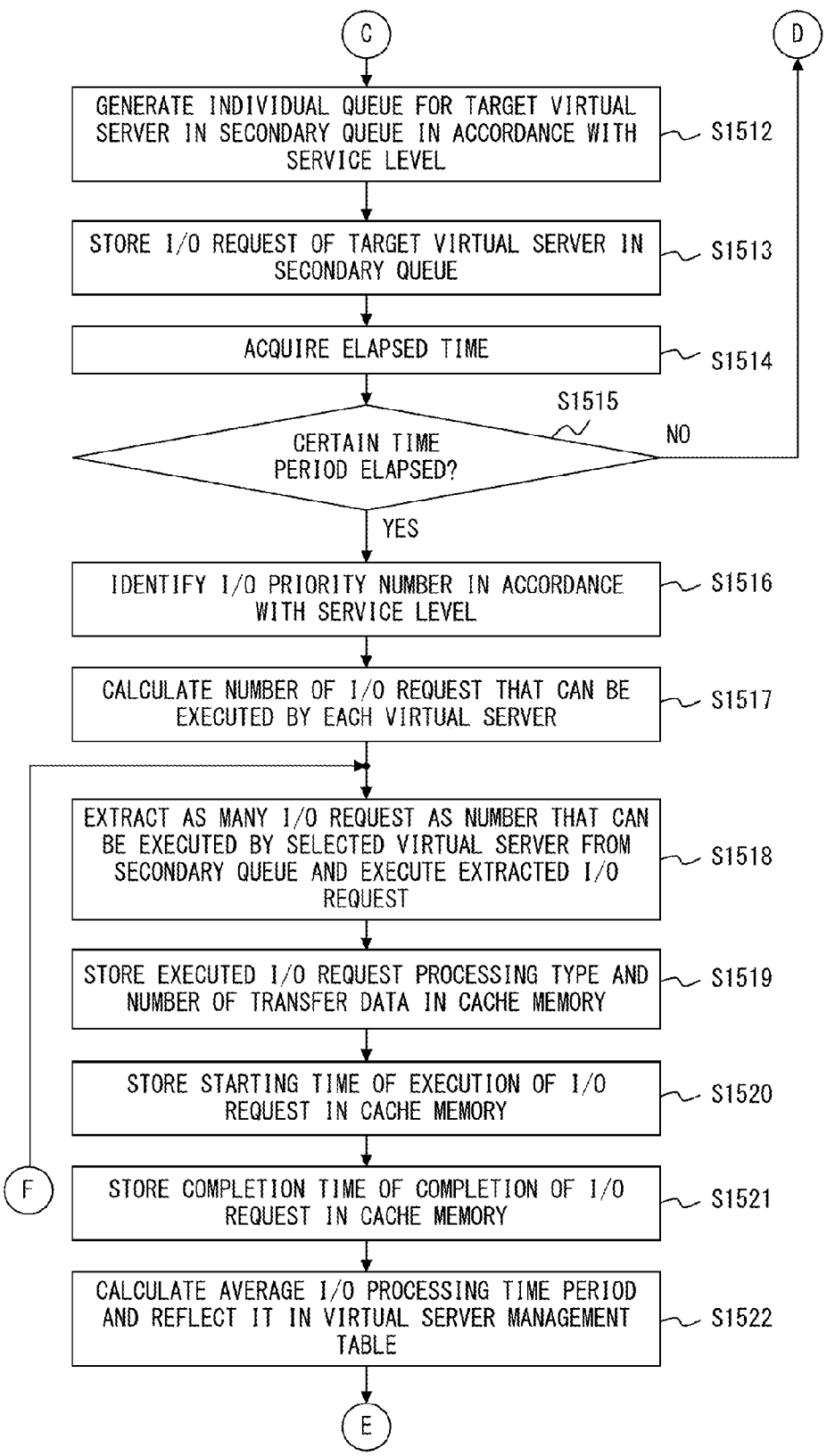
FIG. 14B is a flowchart illustrating execution processing of an I/O request performed by the storage device 220.
Figure 14C:
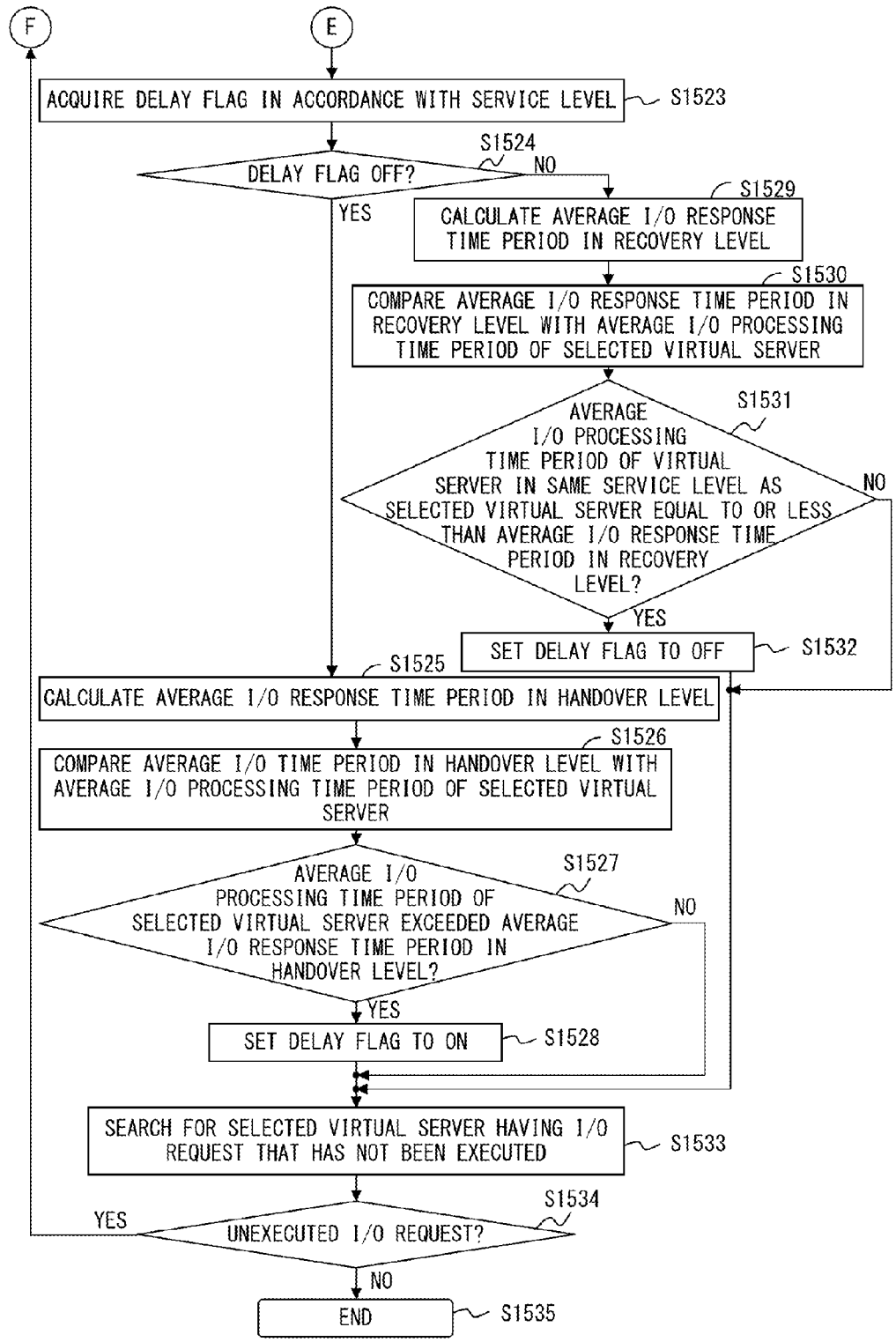
FIG. 14C is a flowchart illustrating execution processing of an I/O request performed by the storage device 220.

FIG. 14A, FIG. 14B and FIG. 14C are a flowchart describing processing of I/O request execution by the storage device 220. Note that it is the active controller 230 included in the storage device 220 that performs the processing from step S1501 to step S1511, but for convenience of description, the storage device 220 is described as a subject of the performance.

The storage device 220, upon its startup (step S1500), reads out the virtual server management table 500 from the flash memory 233. The storage device 220 lays the readout virtual server management table 500 out in a prescribed region of the cache memory 232 (step S1501).

The storage device 220 confirms whether or not the update information of the virtual server management table 500 has been received from the system management server 250 (steps S1502 and S1503 NO).

When the update information of the virtual server management table 500 has been received from the system management server 250 (step S1503 YES), the storage device 220 reflects the received update information in the virtual server management table 500 stored in the flash memory 233 (step S1504). Also, the storage device 220 reflects the received update information in the virtual server management table 500 stored in the cache memory 232 (step S1504).

When starting a timer to measure a prescribed time period (step S1505), the storage device 220 confirms whether or not an I/O request has been received from the physical server 210 (steps S1506 and S1507 NO).

When an I/O request has been received from the physical server 210 (step S1507 YES), the storage device 220 refers to the virtual server management table 500 stored in the cache memory 232. The storage device 220 identifies a virtual server 311 corresponding to an identifier included in the I/O request and the service level of the virtual server 311 (step S1508). The virtual server 311 corresponding to the identifier included in the I/O request at that time is hereinafter referred to as a "target virtual server". The identifier included in the I/O request is the information included in VLAN ID illustrated in FIG. 8.

The storage device 220 refers to the service level management table 400 stored in the cache memory 232 and acquires a delay flag for the service level identified in step S1508 (step S1509). When the delay flag is ON (step S1510 NO), the storage device 220 transfers the I/O request to the queue controller 240 (step S1511). The storage device 220 then shifts the processing to step S1512. In such a case, the queue controller 240 in the storage device 220 performs the subsequent processing.

When the delay flag is OFF (step S1510 YES), the storage device 220 shifts the processing to step S1512. In such a case, the active controller 230 in the storage device 220 performs the subsequent processing. In the subsequent processing, the active controller 230 and the queue controller 240 perform the same processing, and for that reason, the subject that performs the processing is described as the storage device 220.

The storage device 220 generates a queue for each level in accordance with the service level of the target virtual server, or in other words, generates an individual queue for the target virtual server in any of the high-level queue, the middle-level queue, and the low-level queue (S1512). When the individual queue for the target virtual server has already existed, the storage device 220 may skip step S1512 and it shifts the processing to step S1513. The storage device 220 stores I/O requests of the target virtual server in the individual queue for the target virtual server (step S1513).

The storage device 220 refers to the time started in step S1505 and acquires an elapsed time from a prescribed point in time (step S1514).

When the elapsed time acquired in step S1514 is less than a prescribed time period (step S1515 NO), the storage device 220 shifts the processing to step S1506. The storage device 220 repeats the processing from step S1506 to step S1515.

When the elapsed time acquired in step S1514 is equal to the prescribed time period or longer (step S1515 YES), the storage device 220 terminates the time measurement and shifts the processing to step S1516. In such a case, the storage device 220 refers to the service level management table 400 stored in the cache memory 232 and acquires the I/O priority number for each service level (step S1516). The storage device 220 calculates the number of I/O requests that may be executed by the virtual server 311 for each service level (step S1517). The number of I/O requests that may be executed by the virtual server 311 for each service level may be calculated in the same manner as the calculation in step S1009.

The storage device 220 selects an arbitrary virtual server of the virtual servers 311 in which I/O requests are stored in the secondary queue 341. The method of the selection is the same as the one described in step S1010. The storage device 220 extracts and executes as many I/O requests as the number calculated in step S1517 (step S1518). In the following description of processing, the virtual server 311 selected in step S1518 is referred to as a "selected virtual server".

The storage device 220 stores the type of processing and the number of pieces of transfer data for the I/O requests executed in step S1518 in a prescribed region of the cache memory 232 (step S1519). The type of processing and the number of pieces of transfer data for the I/O requests are the same as the ones described in step S1015.

The storage device 220 also stores the starting time of the execution of the I/O requests in step S1518 in a prescribed region of the cache memory 232 (step S1520). When the execution of the I/O requests is completed, the storage device 220 outputs a response to notify the physical server 210 of the completion of the processing for the I/O requests. When the response is output, the storage device 220 stores the current time in a prescribed region of the cache memory 232 (step S1521).

The storage device 220 calculates a response time for each of the I/O requests for which the processing is completed from among the I/O requests executed in step S1518 based on the difference between the starting time recorded in step S1520 and the completion time recorded in step S1521. The storage device 220 then calculates an average response time of I/O requests for which the processing is completed from among the I/O requests executed in step S1518 based on the calculated response times (S1522). The storage device 220 reflects the calculated average response time in the average I/O processing time period (storage device) of the virtual server management table 500 stored in the cache memory 232 (step S1522).

The storage device 220 refers to the service level management table 400 stored in the cache memory 232 and acquires a delay flag in accordance with the service level of the selected virtual server (step S1523).

When the delay flag is OFF (step S1524 YES), the storage device 220 calculates an average I/O response time period at handover level (step S1525). The average I/O response time period at handover level may be calculated by multiplying the average I/O response time period with the handover level, both of which are set in the service level management table 400 stored in the cache memory 232.

The storage device 220 compares the average I/O response time period at handover level calculated in step S1525 with the average I/O processing time period (storage device) for the selected virtual server calculated in step S1522 (step S1526).

When the average I/O processing time period (storage device) for the selected virtual server exceeds the average I/O response time period at handover level (step S1527 YES), the storage device 220 sets the delay flag to ON (step S1528). The storage device 220 then shifts the processing to step S1533. When the average I/O processing time period (storage device) for the selected virtual server is the average I/O response time period at handover level or shorter (step S1527 NO), the storage device 220 shifts the processing to step S1533.

Meanwhile, when the delay flag is ON (step S1524 NO), the storage device 220 calculates an average I/O response time period at recovery level (step S1529). The average I/O response time period at recovery level may be calculated by multiplying the average I/O response time period with the recovery level, both of which are set in the service level management table 400 stored in the cache memory 232.

The storage device 220 compares the average I/O response time period at recovery level calculated in step S1529 with the average I/O processing time period (storage device) for each virtual server in the same service level as the selected virtual server calculated in step S1522 (step S1530).

When the average I/O processing time period (storage device) of all virtual servers in the same service level as the selected virtual server is equal to the average I/O response time period at recovery level or shorter (step S1531 YES), the storage device 220 sets the delay flag to OFF (step S1532). The storage device 220 then shifts the processing to step S1533.

When the average I/O processing time period (storage device) of any of the virtual servers in the same service level as the selected virtual server exceeds the average I/O response time period at recovery level (step S1531 NO), the storage device 220 shifts the processing to step S1533.

When there is an unissued I/O response in the secondary queue 341, or in other words, when there is an individual queue storing an I/O request (steps S1533 and S1534 YES), the storage device 220 shifts the processing to step S1518.

When there is no unissued I/O response in the secondary queue 341, or in other words, when there is no individual queue storing an I/O request (steps S1533 and S1534 NO), the storage device 220 terminates the I/O request execution processing (step S1535).

Note that in step S1528, even though the delay flag is set to ON when the average I/O processing time period (storage device) exceeds the average I/O response time period at handover level, this is not intended to limit the invention to this setting. In step S1528, for example, the delay flag may be set to ON when the amount of transfer per second exceeds the amount of transfer data at the handover level. In such a case, the amount of transfer data per second may be calculated by processing similar to that from step S1015 to step S1019. The amount of transfer data at handover level may be calculated by, for example, multiplying the performance limit with the handover level, both of which are set in the service level management table 400. Similarly, in step S1532, the delay flag may be set to OFF when the amount of transfer data per second is equal to or less than the amount of transfer data at recovery level.

As described above, the storage device 220 identifies a service level of a virtual server 311 corresponding to an identifier set in a received I/O request. The storage device 220 then stores the received I/O request in a queue for each level in the secondary queue 341 corresponding to the identified service level. The storage device 220 also calculates the number of I/O requests that may be executed by the virtual server 311 for each service level. The storage device 220 then acquires and executes as many I/O requests as the calculated number from the secondary queue 342. In this manner, the storage device 220 may control data access from virtual servers 311 to the storage device 220 for each of the virtual servers 311 by using the service level. For example, the storage device 220 may perform a prioritized control that prioritizes the virtual servers 311 for the data access from the virtual servers 311 to the storage device 220 by setting service levels for each of the virtual servers 311.

In addition, the storage device 220 has a normal mode and a load distribution mode for each service level. When an average I/O processing time period (storage device) exceeds a handover level, the storage device 220 is switched from the normal mode to the load distribution mode. In this case, because the storage device 220 performs processing of I/O requests received from the virtual server 311 in a service level switched to the load distribution mode in the queue controller 240, the storage device 220 may distribute loads needed to process the I/O requests for each service level. At that time, because the load needed to process the I/O requests is distributed to the active controller 230 and the queue controller 240, the average I/O processing time period (storage device) that exceeded the handover level may be reduced.

The physical server 210, when I/O requests exceed the performance limit in the service level management table 400, calculates an I/O control number in accordance with the exceeded number, and issues as many I/O requests as the number achieved when the I/O control number is subtracted from the exceeded I/O request number at the next issuing of I/O requests. As a result, the physical server 210 may control the performance of data access from virtual servers 311 to the storage device 220 for each service level so as to be within a prescribed range including the performance limit in the service level management table 400.

As described above, according to the disclosed access control method, it is possible to provide an access control method that controls data access from virtual machines to a storage device for each virtual machine.

All examples and conditional language provided herein are intended for the pedagogical purposes of aiding the reader in understanding the invention and the concepts contributed by the inventor to further the art,and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for controlling access from a virtual machine executed in a server device to a storage device, the method comprising:

acquiring a service level corresponding to a virtual machine identifier, that identifies a virtual machine and is output from the virtual machine together with an input/output command, by using a correspondence relationship between the acquired virtual machine identifier and the service level;

acquiring an allowable number corresponding to the acquired service level, the allowable number indicating an upper limit value of input/output commands executable at once in the virtual machine and being determined based on a maximum input/output number that is a maximum value of the number of input/output commands executable at once in an interface connecting between the server device and the storage device;

executing the input/output command from the virtual machine within the acquired allowable number in at least either the server device or the storage device, in the storage device, receiving the input/output command from the server device together with the virtual machine identifier;

storing the received input/output command in an input/output queue for each service level of a service level corresponding to the virtual machine identifier and being placed in a waiting state;

calculating the allowable number that is a number of input/output commands executable in each of virtual machines;

reading out the input/output command stored in the input/output queue for each service level in an order of a queue in the allowable number, and executing an access to a storage device;

including two operating modes for each service level including a normal mode in which a particular controller included in the storage device executes an input/output process and a load distribution mode in which a controller other than the particular controller included in the storage device executes the input/output command;

monitoring an average processing time period of the input/output command for each virtual machine;

when the average processing time period in any of the virtual machines of same service level in the normal mode exceeds a first threshold, switching the operating mode of the same service level to the load distribution mode; and when the average processing time period of all the virtual machines of same service level in the load distribution mode falls below a second threshold, switching the operating mode of the same service level to the normal mode.

2. The method for controlling access of claim 1, wherein the server device and the storage device each acquire the service level from a management server device and hold the service level, and an execution order of the input/output command is changed in accordance with an execution condition of the input/output command up to the present for each service level in at least either the server device or the storage device.

3. The method for controlling access of claim 1, further comprising:

in the server device storing the input/output command from the virtual machine in a service level queue for each service level corresponding to the virtual machine;

calculating the allowable number that is a number of input/output commands executable in each of virtual machines;

reading out the input/output command stored in the queue for each service level in an order of a queue in the allowable number; and issuing the read input/output command to the storage device together with a virtual machine identifier corresponding to the virtual machine.

4. A storage device, comprising:
a memory that stores a service level set to the virtual machine in association with a virtual machine identifier that identifies a virtual machine executed in a server device;
an interface device that receive an input/output command together with the virtual machine identifier;
an input/output queue for each service level to store the received input/output command for each service level corresponding to the virtual machine identifier and is placed in a waiting state; and
a processor that acquires an allowable number corresponding to the service level, the allowable number indicating an upper limit value of input/output commands executable at once in the virtual machine and being determined based on a maximum input/output number that is a maximum value of the number of input/output commands executable at once in an interface connecting between the server device and the storage device, and reads out the input/output command stored in the input/output queue for each service level in an order of a queue within the acquired allowable number and executes access to a memory device, wherein
the storage device includes two operating modes for each service level including a normal mode in which a particular controller included in the storage device executes an input/output process and a load distribution mode in which a controller other than the particular controller included in the storage device executes the input/output command;
monitors an average processing time period of the input/output command for each virtual machine;
when the average processing time period in any of the virtual machines of same service level in the normal mode exceeds a first threshold, switches the operating mode of the same service level to the load distribution mode; and
when the average processing time period of all the virtual machines of same service level in the load distribution mode falls below a second threshold, switches the operating mode of the same service level to the normal mode.

5. The storage device of claim 4, wherein
the processor changes an order of execution of the input/output command in accordance with an execution condition of the input/output command up to the present for each service level.

* * * * *